(12) United States Patent
Sakamoto et al.

(10) Patent No.: US 11,391,670 B2
(45) Date of Patent: Jul. 19, 2022

(54) OPTICAL WAVEGUIDE AND OPTICAL CONCENTRATION MEASURING APPARATUS

(71) Applicant: Asahi Kasei Microdevices Corporation, Tokyo (JP)

(72) Inventors: Toshiro Sakamoto, Tokyo (JP); Tatsushi Yagi, Tokyo (JP)

(73) Assignee: Asahi Kasei Microdevices Corporation, Tokyo (JP)

( * ) Notice: Subject to any disclaimer, the term of this patent is extended or adjusted under 35 U.S.C. 154(b) by 131 days.

(21) Appl. No.: 16/755,884

(22) PCT Filed: Nov. 12, 2018

(86) PCT No.: PCT/JP2018/041855
§ 371 (c)(1),
(2) Date: Apr. 14, 2020

(87) PCT Pub. No.: WO2019/107133
PCT Pub. Date: Jun. 6, 2019

(65) Prior Publication Data
US 2021/0088440 A1 Mar. 25, 2021

(30) Foreign Application Priority Data
Nov. 29, 2017 (JP) .............................. JP2017-229497

(51) Int. Cl.
*G01N 21/3504* (2014.01)
*G01N 21/3577* (2014.01)
(Continued)

(52) U.S. Cl.
CPC ..... *G01N 21/3504* (2013.01); *G01N 21/3577* (2013.01); *G01N 21/552* (2013.01);
(Continued)

(58) Field of Classification Search
CPC ........... G01N 21/3504; G01N 21/3577; G01N 21/552; G01N 2201/0813;
(Continued)

(56) References Cited

U.S. PATENT DOCUMENTS

2004/0156589 A1 8/2004 Gunn et al.

FOREIGN PATENT DOCUMENTS

JP 2005300212 A 10/2005
JP 2006043120 A 2/2006
(Continued)

OTHER PUBLICATIONS

Jun. 2, 2020, International Preliminary Report on Patentability issued in the International Patent Application No. PCT/JP2018/041855.
(Continued)

*Primary Examiner* — Tri T Ton
(74) *Attorney, Agent, or Firm* — Kenja IP Law PC

(57) ABSTRACT

An optical waveguide 15 includes a substrate 19, a core layer 12, a support 20, and a suppressing portion. The core layer 12 includes a light propagating portion 10 and a diffraction grating portion 11. The diffraction grating portion 11 includes a fine line pattern formed therein. The support 20 is made from a material having a smaller refractive index than a refractive index of the core layer 12. The support 20 supports the core layer 12 with respect to the substrate 19. The suppressing portion suppresses deformation of fine lines 13 that form the fine line pattern. The support 20 is not provided in an entire region between the light propagating portion 10 and the substrate 19 in a cross-section perpendicular to a longitudinal direction of the core layer 12 at least at a position in the longitudinal direction.

18 Claims, 35 Drawing Sheets

(51) Int. Cl.
  G01N 21/552 (2014.01)
  G02B 6/124 (2006.01)
  *G02B 6/12* (2006.01)
(52) U.S. Cl.
  CPC ..... G02B 6/124 (2013.01); *G01N 2201/0813* (2013.01); *G02B 2006/12107* (2013.01); *G02B 2006/12138* (2013.01)
(58) Field of Classification Search
  CPC .......... G02B 2006/12138; G02B 6/124; G02B 2006/12107; G02B 6/305; G02B 6/34; G02B 6/42; G02B 6/4215; A62B 1/00; A62B 1/02; A62B 1/04; A62B 1/06; C21B 9/12; F16L 51/02; F27D 7/04
  USPC ................................ 356/409, 73.1, 460, 477
  See application file for complete search history.

(56) References Cited

FOREIGN PATENT DOCUMENTS

| | | |
|---|---|---|
| JP | 2011095159 A | 5/2011 |
| WO | 2017003353 A1 | 1/2017 |

OTHER PUBLICATIONS

Jan. 22, 2019, International Search Report issued in the International Patent Application No. PCT/JP2018/041855.

FIG. 1
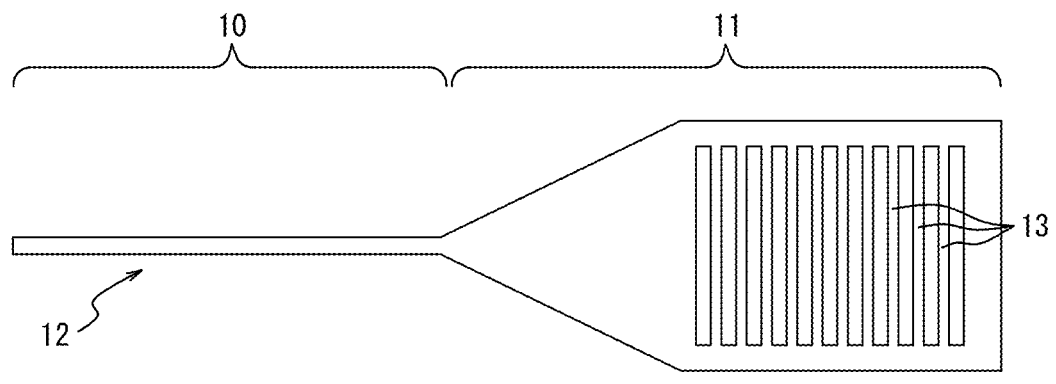
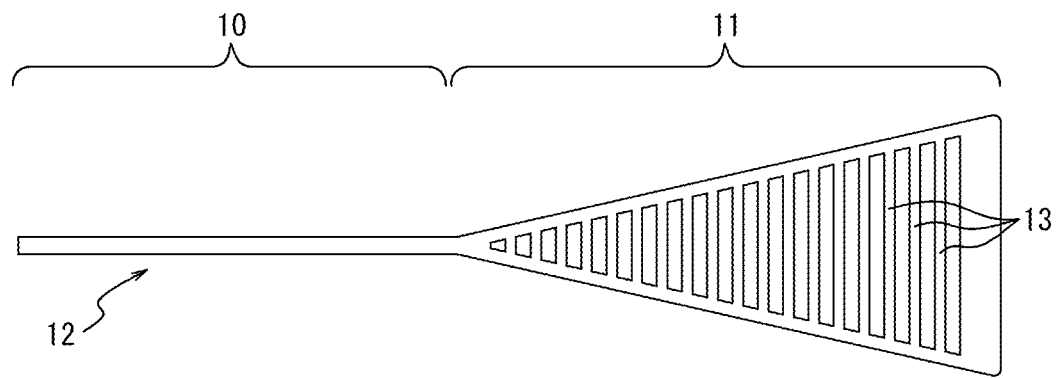
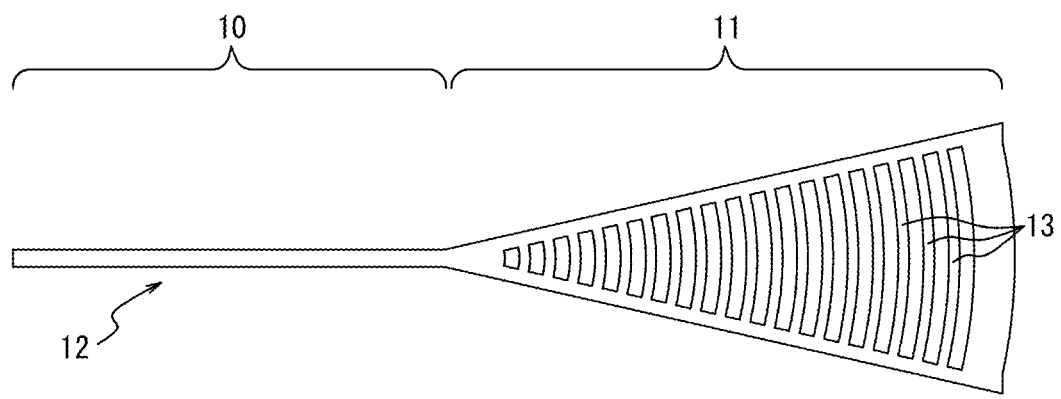

FIG. 35
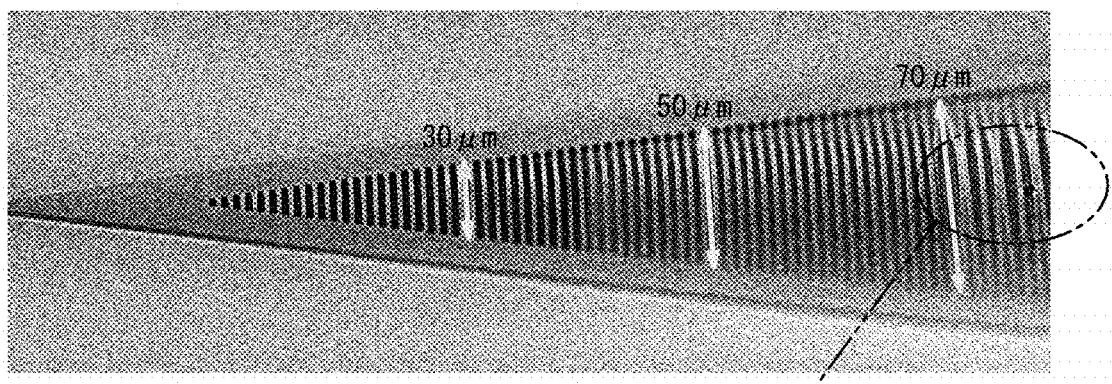
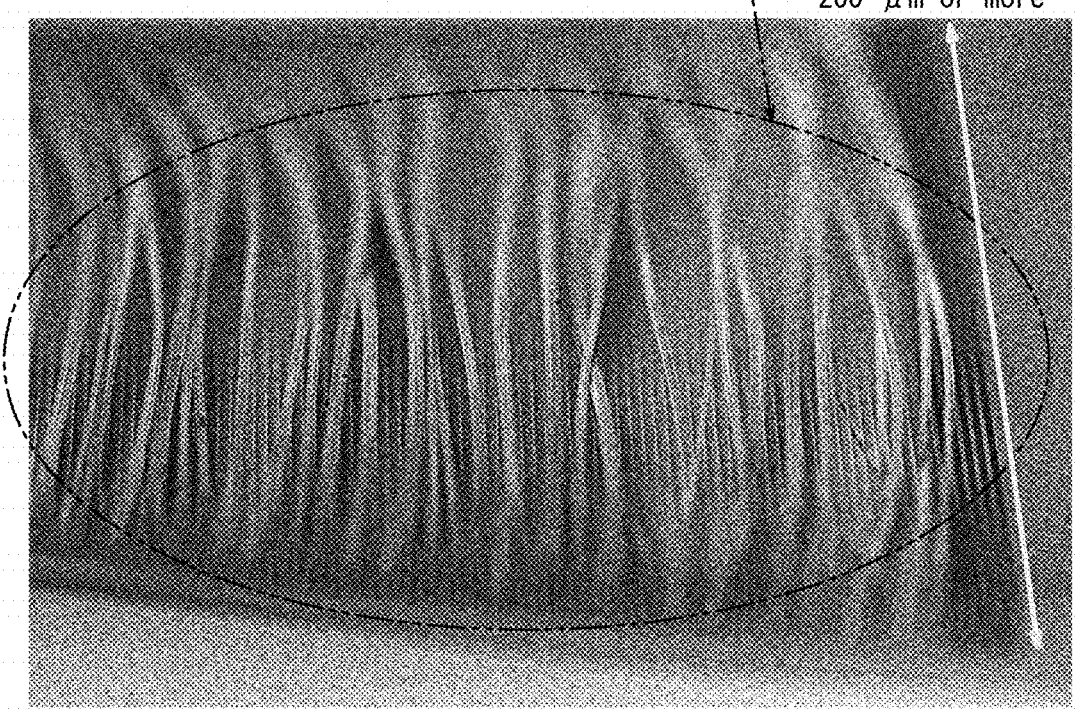
Particularly significant bending
200 μm or more

OPTICAL WAVEGUIDE AND OPTICAL CONCENTRATION MEASURING APPARATUS

CROSS REFERENCE TO RELATED APPLICATION

This application claims priority to and the benefit of Japanese Patent Application No. 2017-229497 filed on Nov. 29, 2017, the entire contents of which are incorporated herein by reference.

TECHNICAL FIELD

The present disclosure relates to an optical waveguide, an optical concentration measuring apparatus, and a method for manufacturing an optical waveguide.

BACKGROUND

When a refractive index of a material that forms a structure is greater than a refractive index of a material external to the structure, light propagating through the structure proceeds therein while repeatedly undergoing total internal reflection on the boundary between the structure and the outside of the structure. When light propagating through the structure undergoes the total internal reflection on the boundary, light extends into the outside having the smaller refractive index. This extension is referred to as an evanescent wave (see FIG. 34). In the process of propagation of light L, an evanescent wave EW can be absorbed by a substance 53 adjacent to a structure 51. Thus, the substance 53 adjacent to the structure 51 can be detected or identified based on a change in the intensity of the light L propagating through the structure 51. An analytical method using the principle of an evanescent wave as described above is referred to as the attenuated total reflection (ATR) method and is used for the chemical composition analysis and the like of the substance 53. Infrared radiation is typically used as light to propagate. Substances have respective properties of selectively absorbing infrared radiation in particular wavelengths. This enables analysis or sensing of a substance by causing propagation of infrared radiation corresponding to an absorbing spectrum of a substance to be measured.

PTL 1 set forth below proposes an optical waveguide sensor in which a sensor adopts the ATR method. This optical waveguide sensor is configured to cause propagation of light through a core layer formed on a substrate and detect a substance in contact with the core layer using the evanescent wave.

Sensitivity of a sensor using the ATR method can be improved by increasing an interaction quantity between a evanescent wave and a substance to be measured, and by reducing light absorbed by a material other than the substance to be measured. In recent years, as such, an optical wave guide having a free-standing structure in which supports for supporting a core layer are intermittently provided in a light propagating direction and large regions of the core layer are floated is proposed as described in PTL 2.

Incidentally, a sensor using the ATR method needs a portion for introducing light from a light source into a core layer of an optical waveguide and a portion for extracting light toward a photodetector from the core layer of the optical waveguide. As such, a diffraction grating is often provided between the light source and the optical waveguide and between the photodetector and the optical waveguide, so as to bend an optical axis of light. In this case, the smaller the loss of light in the diffraction grating is, the higher the intensity of a signal detected by the photodetector is and the higher the sensitivity of the sensor is.

When the diffraction grating is in size similar to a light emitting surface of a light source and a light receiving surface of a photodetector that are being used, an efficiency in introducing light into the optical waveguide from the light source and an efficiency in extracting light toward the photodetector from the optical waveguide can be improved.

CITATION LIST

Patent Literature

PTL 1: JP-A-2005-300212
PTL 2: WO2017/003353A1

SUMMARY

Technical Problem

A light emitting element such as an infrared LED and a light receiving element such as an infrared sensor often have a light emitting/receiving surface with an area of at least 100 $\mu m \times 100$ $\mu m$, so as to increase light to be output and sensitivity of a sensor. For highly efficient coupling between such a light emitting element and an optical waveguide and between a light receiving element and the optical waveguide, diffraction gratings need to be large in size in a manner corresponding to the light emitting surface and the light receiving surface. However, when a large diffraction grating is formed in a structure in which the diffraction grating portion is free-standing as described in the PTL 2, a fine line pattern forming the diffraction grating bends (e.g., see "particularly significant bending"), increasing or reducing distances between the fine lines adjacent to one another and inhibiting the diffraction grating from being formed with appropriate periods. In order to achieve a high diffraction efficiency, it is essential to form the diffraction grating with periods corresponding to a wavelength to be used. Otherwise, occurrence of bending as described above causes loss of light in the diffraction grating. As such, an object of the present disclosure is to provide an optical waveguide and an optical concentration measuring apparatus that can improve the efficiency in introducing light into the optical waveguide from the light source and the efficiency in extracting light toward a photodetector from the optical waveguide.

Solution to Problem

As a result of diligent researches for solving the above problem, we have found that unfixed fine lines having the respective lengths of 30 $\mu m$ or more start bending, unfixed fine lines having the respective lengths of 50 $\mu m$ or more significantly bend, and unfixed fine lines having the respective lengths of 70 $\mu m$ or more particularly significantly bend. Namely, we have found that the above problem can be solved by reducing deformation of the fine lines at a position dividing the fine lines into portions having the respective lengths of less than 70 $\mu m$, and thus completed the present disclosure. That is, the present disclosure will be described below.

To achieve the aforementioned objective, an optical waveguide according to an embodiment of the present disclosure is an optical waveguide to be used for an optical concentration measuring apparatus for measuring concentration of a gas to be measured or a liquid to be measured, and includes a substrate, a core layer, a support, and a suppressing portion. The core layer extends in a longitudinal direction, is capable of propagating light, and includes a light propagating portion and a diffraction grating portion in which a fine line pattern is formed. The support is formed from a material having a smaller refractive index than a refractive index of the core layer and connects at least a portion of the substrate and at least a portion of the core layer in a manner supporting the core layer with respect to the substrate. The suppressing portion suppresses deformation of fine lines that form the fine line pattern. The support is not provided in an entire region between the light propagating portion and the substrate in a cross-section perpendicular to a longitudinal direction of the core layer at least at a position in the longitudinal direction.

To achieve the aforementioned objective, an optical waveguide according to another embodiment of the present disclosure is an optical waveguide to be used for an optical concentration measuring apparatus for measuring concentration of a gas to be measured or a liquid to be measured, and includes a substrate, a core layer, and a support. The core layer extends in a longitudinal direction, is capable of propagating light, and includes a light propagating portion and a diffraction grating portion formed of a fine line pattern. The support is formed from a material having a smaller refractive index than a refractive index of the core layer and connects at least a portion of the substrate and at least a portion of the core layer in a manner supporting the core layer with respect to the substrate. The support is not provided in an entire region between the light propagating portion and the substrate in a cross-section perpendicular to a longitudinal direction of the core layer at least at a position in the longitudinal direction. At least a portion of the support is provided at least at a position dividing fine lines that form the fine line pattern.

To achieve the aforementioned objective, an optical waveguide according to still another embodiment of the present disclosure is an optical waveguide to be used for an optical concentration measuring apparatus for measuring concentration of a gas to be measured or a liquid to be measured, and includes a substrate, a core layer, and a support. The core layer extends in a longitudinal direction, is capable of propagating light, and includes a light propagating portion and a diffraction grating portion formed of a fine line pattern and a partition provided between a plurality of fine lines that form the fine line pattern. The support is formed from a material having a smaller refractive index than a refractive index of the core layer and connects at least a portion of the substrate and at least a portion of the core layer in a manner supporting the core layer with respect to the substrate. The support is not provided in an entire region between the light propagating portion and the substrate in a cross-section perpendicular to a longitudinal direction of the core layer at least at a position in the longitudinal direction. At least one of the fine lines has a gap from the substrate. At least a portion of the diffraction grating portion is supported with respect to the substrate by the support.

To achieve the aforementioned objective, an optical concentration measuring apparatus according to the present disclosure includes the optical waveguide according to any one of the above embodiments of the present disclosure, a light source capable of introducing light into a core layer, and a detector capable of receiving light having propagated through the core layer.

Advantageous Effect

According to the present disclosure, the optical waveguide of a free-standing type can improve the efficiency in introducing light into the optical waveguide from the light source and the efficiency in extracting light toward the photodetector from the optical waveguide.

BRIEF DESCRIPTION OF THE DRAWINGS

In the accompanying drawings:

FIG. 1 is a diagram illustrating example shapes of an end portion of an optical waveguide to which the present disclosure is applied;

FIG. 35 is a diagram illustrating a state in which a large diffraction grating having a free-standing structure is bent.

DETAILED DESCRIPTION

Figure 2:
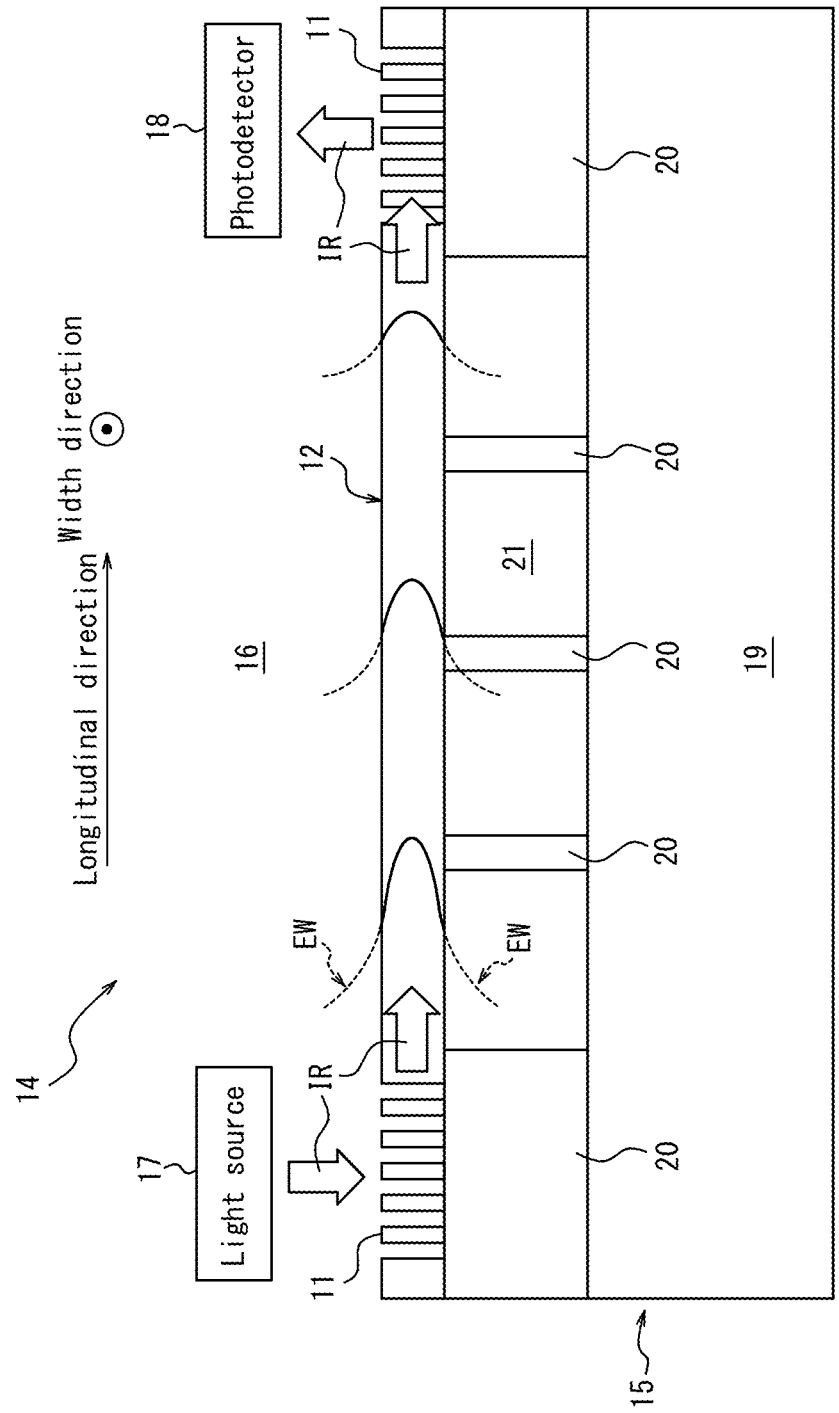
FIG. 2 is a diagram illustrating a schematic configuration of an optical waveguide according to a first embodiment of the present disclosure and a concentration measuring apparatus that includes the optical waveguide.

Hereinafter, embodiments of the present disclosure will be described. It should be appreciated that the embodiments do not limit the claimed subject matter. Also, not all combinations of features described in the embodiments are necessarily essential to the solution to the problem according to the present disclosure.

Optical Waveguide

An optical waveguide according to a first embodiment of the present disclosure is an optical waveguide to be used for an optical concentration measuring apparatus for measuring concentration of a gas to be measured or a liquid to be measured. The optical waveguide includes a substrate, a core layer, a support, and a suppressing portion. The core layer extends in a longitudinal direction, is capable of propagating light, and includes a light propagating portion and a diffraction grating portion in which a fine line pattern is formed. The support is formed from a material having a smaller refractive index than a refractive index of the core layer and connects at least a portion of the substrate and at least a portion of the core layer in a manner supporting the core layer with respect to the substrate. The suppressing portion suppresses deformation of fine lines that form the fine line pattern. The support is not provided in an entire region between the light propagating portion and the substrate in a cross-section perpendicular to the longitudinal direction of the core layer at least at a position in the longitudinal direction. The longitudinal direction is the longest extending direction in a three-dimensional structure in a manner extending in at least one direction and includes a curved direction as well as a linear direction. The fine lines are portions formed between grooves or openings, adjacent to each other, formed in a portion of the diffraction grating portion. In a configuration in which grooves are formed, the fine lines are stepped. In a configuration in which openings are formed, the fine lines are columnar. The fine lines may extend linearly or in a curved manner. The fine line pattern may include a plurality of fine lines. The refractive index refers to a refractive index with respect to light in any wavelength or light in a particular wavelength. Particularly in the optical concentration measuring apparatus, light in a particular wavelength is light which propagates through the core layer. The suppressing portion may be configured in any manner that has a function of suppressing bending of the fine lines within the fine line pattern. Note that air or the like that does not have the function of suppressing bending is not considered as the suppressing portion. The suppressing portion may include a support provided between the diffraction grating portion and the substrate. The fine lines may have a first region in which the support is provided between the fine lines and the substrate and a second region in which the support is not provided between the fine lines and the substrate. A maximum length of the second region may be less than 70 µm, preferably less than 50 µm, particularly preferably less than 30 µm. The suppressing portion may include a partition provided between fine lines adjacent to each other. The fine lines adjacent to each other refers to any fine lines adjacent to each other in the extending directions thereof. The partition may be integrally formed with the fine line pattern. A continuous or intermittent total length of at least one of the fine lines may be 30 µm or more. The suppressing portion may be provided at least at a position dividing the fine lines into portions having the respective lengths of less than 70 µm, preferably less than 50 µm, particularly preferably less than 30 µm. In the fine line pattern in which a continuous or intermittent total length of the fine lines is less than 70 µm, the suppressing portion is provided at a position dividing the fine lines into portions of shorter than the original lengths thereof. The cross-section perpendicular to the longitudinal direction of the core layer is in a rectangular shape by way of example, and not limited thereto. The configuration in which the support is not provided refers to a configuration in which the core layer is bridged between two supports that are adjacent to each other in the longitudinal direction. The configuration in which the support is not provided refers to a configuration in which, in the entire region of the core layer opposing the substrate, a gap or a medium having a lower absorptivity of light that is to propagate through the core layer than an absorptivity of the support is provided between two supports adjacent to each other in the longitudinal direction.

According to the optical waveguide of the first embodiment, the support is not provided in an entire region between the light propagating portion and the substrate in the cross-section perpendicular to the longitudinal direction of the core layer at least at a position in the longitudinal direction, and the suppressing portion for suppressing deformation of the fine lines is provided. Thus, the optical waveguide according to the first embodiment can suppress bending which occurs at the fine line pattern in a large diffraction grating portion in the optical waveguide where the support is not provided at a position in the longitudinal direction, and the diffraction grating can be formed with appropriate periods as designed. As a result, loss of light in the diffraction grating can be efficiently suppressed. Accordingly, the optical density measuring apparatus that includes the optical waveguide according to the first embodiment can improve an efficiency in introducing light into the optical waveguide from a light source and an efficiency in extracting light toward a photodetector from the optical waveguide. By configuring the suppressing portion using the support provided between the diffraction grating portion and the substrate, bending as described above can be suppressed and, simultaneously, a diffraction grating portion relatively large in size can be stably supported on the substrate. In the diffraction grating portion relatively large in size in which at least one of the fine lines has the length of 30 µm or more, bending of the fine line pattern is reliably suppressed when the maximum length of the second region of the fine lines is less than 70 µm, bending of the fine line pattern is more reliably suppressed when the maximum length of the second region of the fine lines is less than 50 µm, and bending of the fine line pattern is particularly reliably suppressed when the maximum length of the second region of the fine lines is less than 30 µm. Alternatively, by configuring the suppressing portion using a partition provided between fine lines adjacent to each other in the diffraction grating portion, the fine lines are divided. Thus, fine lines adjacent to one another are suppressed from approaching one another, facilitating maintaining appropriate periods of the fine line pattern. The support may or may not be provided where the partition is provided. By forming the partition integrally with the fine line pattern, the configuration can be simplified and the manufacturing cost can be reduced. In the diffraction grating portion relatively large in size in which the continuous or intermittent total length of at least one fine lines is 30 µm or more, bending of the fine line pattern can be reliably suppressed by providing the suppressing portion at least at a position dividing the fine lines into portions having the respective lengths of less than 70 µm, bending of the fine line pattern can be more reliably suppressed by providing the suppressing portion at least at a position dividing the fine lines into portions having the respective lengths of less than 50 µm, and bending of the fine line pattern can be particularly reliably suppressed by providing the suppressing portion at least at a position dividing the fine lines into portions having the respective lengths of less than 30 µm.

An optical waveguide according to a second embodiment of the present disclosure is an optical waveguide to be used for an optical concentration measuring apparatus for measuring concentration of a gas to be measured or a liquid to be measured. The optical waveguide includes a substrate, a core layer, and a support. The core layer extends in a longitudinal direction, is capable of propagating light, and includes a light propagating portion and a diffraction grating portion in which a fine line pattern is formed. The support is formed from a material having a smaller refractive index than a refractive index of the core layer and connects at least a portion of the substrate and at least a portion of the core layer in a manner supporting the core layer with respect to the substrate. The support is not provided in an entire region between the light propagating portion and the substrate in a cross-section perpendicular to the longitudinal direction of the core layer at least at a position in the longitudinal direction. In the diffraction grating portion, at least a portion of the support is provided at least at a position dividing fine lines that form the fine line pattern. The longitudinal direction is the longest extending direction in a three-dimensional structure in a manner extending in at least one direction and includes a curved direction as well as a linear direction. The fine lines are steps formed between linear or curved grooves or openings parallel to one another which are adjacent to one another and formed by excavation in a portion of the diffraction grating portion. The refractive index refers to the refractive index with respect to light in any wavelength or light in a particular wavelength. Particularly in the optical concentration measuring apparatus, light in a particular wavelength is light that propagates through the core layer. The cross-section perpendicular to the longitudinal direction of the core layer is in a rectangular shape by way of example, and is not limited thereto. In the diffraction grating portion, at least one of the fine lines has the lengths of 30 µm or more. In the diffraction grating portion, the support may be provided at least at a position dividing the fine lines into portions having the respective lengths of less than 70 µm, more preferably the respective lengths of less than 50 µm, particularly preferably the respective lengths of less than 30 µm. In the fine line pattern in which the fine lines have the respective lengths of less than 70 µm, the support is provided at a position dividing the fine lines into portions shorter than the original lengths thereof.

According to the optical waveguide of the second embodiment of the present disclosure, the support is not provided in the entire region between the light propagating portion and the substrate in a cross-section perpendicular to the longitudinal direction of the core layer at least at a position in the longitudinal direction. At least a portion of the support is provided at a position dividing the fine lines in the diffraction grating portion in which the fine line pattern is formed. Thus, the optical waveguide according to the second embodiment of the present disclosure can suppress bending which occurs at the fine line pattern in a large diffraction grating portion in the optical waveguide in which the support is not provided at a position in the longitudinal direction, and the diffraction grating can be formed with appropriate periods as designed. As a result, loss of light in the diffraction grating can be efficiently suppressed. Accordingly, the optical concentration measuring apparatus that includes the optical waveguide according to the second embodiment can improve the efficiency in introducing light into the optical waveguide from the light source and the efficiency in extracting light toward the photodetector from the optical waveguide. In the diffraction grating portion relatively large in size in which at least one of the fine lines has the length of 30 µm or more, bending of the fine line pattern can be reliably suppressed by providing the support at least at a position dividing the fine lines into portions having the respective lengths of less than 70 µm, bending of the fine line pattern can be more reliably suppressed by providing the support at least at a position dividing the fine lines into portions having the respective lengths of less than 50 µm, and bending of the fine line pattern can be particularly reliably suppressed by providing the support at least at a position dividing the fine lines into portions having the respective lengths of less than 30 µm.

An optical waveguide according to a third embodiment of the present disclosure is an optical waveguide to be used for an optical concentration measuring apparatus for measuring concentration of a gas to be measured or a liquid to be measured. The optical waveguide includes a substrate, a core layer, and a support. The core layer extends in a longitudinal direction, is capable of propagating light, and includes a light propagating portion and a diffraction grating portion in which a fine line pattern is formed and a partition is provided between a plurality of fine lines that form the fine line pattern. The support is formed from a material having a smaller refractive index than a refractive index of the core layer and connects at least a portion of the substrate and at least a portion of the core layer in a manner supporting the core layer with respect to the substrate. The support is not provided in an entire region between the light propagating portion and the substrate in a cross-section perpendicular to the longitudinal direction of the core layer at least at a position in the longitudinal direction. At least one of the fine lines has a gap from the substrate, and at least a part of the diffraction grating portion is supported with respect to the substrate by the support. The longitudinal direction is the longest extending direction in a three-dimensional structure in a manner extending in at least one direction and includes a curved direction as well as a linear direction. The fine lines are steps formed between linear or curved grooves or openings parallel to one another which are adjacent to one another and formed by excavation in a portion of the diffraction grating portion. The refractive index refers to the refractive index with respect to light in any wavelength or light in a particular wavelength. Particularly in the optical concentration measuring apparatus, light in a particular wavelength is light that propagates through the core layer. The cross-section perpendicular to the longitudinal direction of the core layer is in a rectangular shape by way of example, and is not limited thereto. At least in a portion of the diffraction grating portion, a total length of a plurality of fine lines in their extending direction may be 30 µm or more. That is, an intermittent total length of at least one of the fine lines in the diffraction grating portion may be 30 µm or more. The length of each of the plurality of fine lines may be less than 70 µm, preferably less than 50 µm, particularly preferably less than 30 µm. In the fine line pattern in which the total length of the plurality of fine lines in their extending direction is less than 70 µm, the length of each of the plurality of fine lines is less than the total length in their extending direction.

According to the optical waveguide of the third embodiment of the present disclosure, the core layer includes the light propagating portion and the diffraction grating portion formed of the fine line pattern and the partition, and the support is not provided in the entire region between the light propagating portion and the substrate in the cross-section perpendicular to the longitudinal direction of the core layer at least at a position in the longitudinal direction. Thus, the optical waveguide according to the third embodiment of the present disclosure can suppress bending which occurs at the fine line pattern in a large diffraction grating portion in the optical waveguide in which the support is not provided at a position in the longitudinal direction, and the diffraction grating can be formed with appropriate periods as designed. As a result, loss of light in the diffraction grating can be efficiently suppressed. Accordingly, the optical concentration measuring apparatus that includes the optical waveguide according to the third embodiment can improve the efficiency in introducing light into the optical waveguide from the light source and the efficiency in extracting light toward the photodetector from the optical waveguide. In the diffraction grating portion relatively large in size in which an intermittent total length of at least one of the fine lines is 30 µm or more, bending of the fine line pattern can be reliably suppressed by setting the length of each of the plurality of fine lines to be less than 70 µm, bending of the fine line pattern can be more reliably suppressed by setting the length of each of the plurality of fine lines to be less than 50 µm, and bending of the fine line pattern can be particularly reliably suppressed by setting the length of each of the plurality of fine lines to be less than 30 µm.

At least a portion of the core layer may be exposed or coated with a thin film. In the optical concentration measuring apparatus, the thin film has a thickness smaller than ¼ of a wavelength, in vacuum, of light that propagates through the core layer. Thus, the core layer can come into contact with a gas to be measured or a liquid to be measured. In this way, an evanescent wave and a gas to be measured or a liquid to be measured can interact with each other, and concentration of the gas to be measured or the liquid to be measured can be measured.

Hereinafter, each constituent element of the optical waveguide will be described with reference to specific examples.

Core Layer

The core layer may be any layer that extends in the longitudinal direction and can allow propagation of light in the longitudinal direction. Specific examples include a core layer made of silicon (Si) or gallium arsenide (GaAs). The core layer has an elongated plate-like shape in the present embodiment.

According to the first embodiment, the core layer includes the light propagating portion used for the purpose of propagating light, and the diffraction grating portion that is formed of the fine line pattern and used for the purpose of introducing light into the optical waveguide or extracting light from the optical waveguide. The suppressing portion is provided to suppress deformation of the fine lines that form the fine line pattern. The support is not provided in the entire region of the core layer, particularly between the light propagating portion and the substrate, in the cross-section perpendicular to a longitudinal direction of the light propagation portion, in particular, in the core layer at least at a position in the longitudinal direction. Because the support is not provided, an interaction quantity between the evanescent wave extended from the core layer and an ambient gas or liquid can be increased. Further, because the suppressing portion is provided, bending caused by expansion and contraction of the core layer can be suppressed.

According to the second embodiment, the core layer includes the light propagating portion used for the purpose of propagating light, and the diffraction grating portion that is formed of the fine line pattern and used for the purpose of introducing light into the optical waveguide or extracting light from the optical waveguide. The support is not provided in the entire region of the core layer, particularly between the light propagating portion and the substrate, in the cross-section perpendicular to the longitudinal direction of the light propagation portion, in particular, in the core layer at least at a position in the longitudinal direction. The diffraction grating portion is supported at least by the support at the position dividing the fine lines that form the fine line pattern.

According to the third embodiment, the core layer includes the light propagating portion used for the purpose of propagating light, and a diffraction grating portion used for the purpose of introducing light into the optical waveguide or extracting light from the optical waveguide. The support is not provided in the entire region of the core layer, particularly between the light propagating portion and the substrate, in the cross-section perpendicular to the longitudinal direction of the light propagation portion, in particular, in the core layer at least at a position particularly in the longitudinal direction. The diffraction grating portion has the fine line pattern formed of a plurality of fine lines and a partition provided between the plurality of fine lines. At least one of the fine lines of the diffraction grating portion has a gap from the substrate. At least a portion of the diffraction grating portion is supported with respect to the substrate by the support.

At least a portion of the core layer may be exposed so as to be able to come into direct contact with the gas to be measured or the liquid to be measured. Also, at least a portion of the core layer may be coated with a thin film having the thickness less than ¼ of the wavelength, in vacuum, of light that propagates through the core layer, so as to be able to come into contact with the gas to be measured or the liquid to be measured through the thin film. In this way, the evanescent wave and the gas to be measured or the liquid to be measured can interact with each other, and the concentration of the gas to be measured or the liquid to be measured can be measured.

Light that propagates through the core layer may be infrared radiation serving as an analog signal. An analog signal refers to a signal that indicates an amount of a change in light energy, rather than a signal involved in a determination on a change in light energy using two values, i.e. 0 (a low level) or 1 (a high level). Thus, the optical waveguide according to each of the embodiments is applicable to sensors or analysis apparatuses. In this case, the wavelength of infrared radiation may be between 2 μm and 12 μm. Infrared radiation in a wavelength within this range is absorbed by gasses typically floating in the environment ($CO_2$, CO, NO, $N_2O$, $SO_2$, $CH_4$, $H_2O$, $C_2H_6O$, and the like). Accordingly, the optical waveguide according to each of the embodiments can be used as a gas sensor.

Substrate

The substrate may be any substrate on which the support and the core layer can be formed. In particular, the substrate may be a silicon substrate, a GaAs substrate, or the like. The main surface of the substrate on which at least the core layer is provided may be coated with a film made from a different material from the substrate. The film does not need to have a thickness of 1 μm or more at least in a portion of a region, which does not overlap with the core layer in a plan view, of the substrate. In other words, the thickness of the film covering at least a portion of a core-layer-side region of the substrate, except a region overlapping with the core layer when viewed from the thickness direction of the core layer, may be less than 1 μm. Preferably, the thickness of the film covering at least the portion of the core-layer-side region of the substrate, except the region overlapping with the core layer when viewed from the thickness direction of the core layer, may be less than 0.5 μm. More preferably, the film does not need to be provided at least in the portion of the region, which does not overlap with the core layer in a plan view, of the substrate. In other words, particularly preferably, at least a portion of the core-layer-side region of the substrate, except the region overlapping with the core layer when viewed from the thickness direction of the core layer, may be exposed.

The optical waveguide and the optical concentration measuring apparatus according to the embodiments have a free-standing structure in which the support is not provided in a portion of the core layer. Because the free-standing structure has difficulty in maintaining the structure when subjected to conventional dicing using a blade and cutting water, dicing that uses a laser beam to separate the optical waveguide may be applied. In performing laser dicing, when a film that is made of different material from the substrate and has a great thickness is provided in a region to be subjected to dicing, the film may inhibit laser beam from entering the substrate and generate debris during dicing. According to the embodiments, on the other hand, although the substrate is coated with the film made from a different material from the substrate, the film does not have the thickness of 1 μm or more in at least a portion of the region, which does not overlap with the core layer in a plan view, of the substrate. Thus, the film is suppressed from inhibiting entry of the laser beam into the substrate and from generating debris.

Support

The support connects at least a portion of the substrate and at least a portion of the core layer. The support may be formed from any material that can connect the substrate and the core layer and has a smaller refractive index than a refractive index of the core layer with respect to light in any wavelength or light that propagates through the core layer. Examples of the material forming the support include $SiO_2$.

Example methods of forming the support include etching a buried oxide (BOX) layer (a $SiO_2$ layer) in a SOI (Silicon On Insulator) substrate, whereby a structure in which the core layer (a Si layer) is supported with respect to the substrate (Si layer) by the BOX layer is formed.

Optical Concentration Measuring Apparatus

An optical concentration measuring apparatus according to an embodiment of the present disclosure includes the optical waveguide according to one of the embodiments of the present disclosure, a light source capable of introducing light into the core layer, and a detector capable of detecting light that has propagated through the core layer.

Each constituent element of the optical concentration measuring apparatus will be described below using specific examples.

Light Source

The light source may be any light source capable of introducing light into the core layer. In a case in which infrared radiation is used to measure a gas, an incandescent bulb, a ceramic heater, a MEMS (Micro Electro Mechanical Systems) heater, an infrared radiation LED (Light Emitting Diode), or the like can be used as the light source. The light source may be arranged at any position where the light source can be optically connected to the optical waveguide. For example, the light source may be arranged adjacent to the optical waveguide within the same individual as the optical waveguide, or arranged as another individual at a certain distance from the optical waveguide. In a case in which ultraviolet radiation is used to measure a gas, a mercury lamp, an ultraviolet LED, or the like can be used as the light source. In a case in which an X-ray is used to measure a gas, an electron beam, an electron laser, or the like can be used as the light source.

Light that propagates through the core layer of the optical waveguide of the optical concentration measuring apparatus may be infrared radiation serving as an analog signal. Here, an analog signal refers to a signal that indicates an amount of a change in light energy, rather than a signal involved in a determination on a change in light energy using two values, i.e. 0 (a low level) or 1 (a high level). Thus, the optical concentration measuring apparatus is applicable to sensors or analysis apparatuses. In this case, the wavelength of infrared radiation may be between 2 μm and 12 μm.

Infrared radiation in a wavelength within this range is absorbed by gasses typically floating in the environment ($CO_2$, CO, NO, $N_2O$, $SO_2$, $CH_4$, $H_2O$, $C_2H_6O$, and the like). Accordingly, the optical concentration measuring apparatus according to the present embodiment can be used as a gas sensor.

Detector

The detector may be any detector capable of detecting light that has propagated through the core layer of the optical waveguide. In a case in which infrared radiation is used to measure a gas, a thermal infrared sensor such as a pyroelectric sensor, a thermopile, or a bolometer, a quantum infrared sensor such as a diode or a phototransistor, or the like can be used as the detector. In a case in which an ultraviolet ray is used to measure a gas, a quantum ultraviolet sensor such as a diode or a phototransistor, or the like can be used. In a case in which an X-ray is used to measure a gas, various semiconductor sensors can be used as the detector.

EMBODIMENTS

The present disclosure is applied to the optical waveguide that includes a light propagating portion 10 and a diffraction grating portion 11 as illustrated by the three examples in FIG. 1. Further, the present disclosure is applied to the light propagating portion 10 in which a portion of a core layer 12 is not connected to the support and, simultaneously, a continuous total length of at least one of fine lines 13 forming grating or the fine line pattern of the diffraction grating portion 11 is 30 µm or more. The length of the fine lines 13 forming the grating refers to the length along the grating and does not necessarily need to be linear and may be curved (see the core layer 12 illustrated on the bottom in the figure).

First Embodiment

An optical waveguide according to the first embodiment of the present disclosure and an optical concentration measuring apparatus 1 that includes the optical waveguide of the first embodiment will be described with reference to FIG. 2 to FIG. 6.

FIG. 2 is a diagram illustrating a schematic configuration of an optical concentration measuring apparatus 14 according to the first embodiment and also illustrates a conceptual diagram of an ATR method using an optical waveguide 15 according to the first embodiment. As illustrated in FIG. 2, the optical concentration measuring apparatus 14 is installed to be used in an external space 16 that contains a gas whose concentration or the like is to be detected. The optical concentration measuring apparatus 14 includes the optical waveguide 15 according to the first embodiment, a light source 17 capable of causing light (infrared radiation IR in the first embodiment) to enter the core layer 12 provided to the optical waveguide 15, and a photodetector 18 (an example of the detector) capable of receiving infrared IR having propagated through the core layer 12.

The optical waveguide 15 includes a substrate 19, the core layer 12 capable of propagating infrared radiation IR (an example of light), and supports 20 that support at least portions of the substrate 19 and at least portions of the core layer 12 in a manner supporting the core layer 12 with respect to the substrate 19. The core layer 12 and the substrate 19 are formed from, for example, silicon (Si). The support 20 is formed from, for example, silicon dioxide ($SiO_2$).

Figure 3:
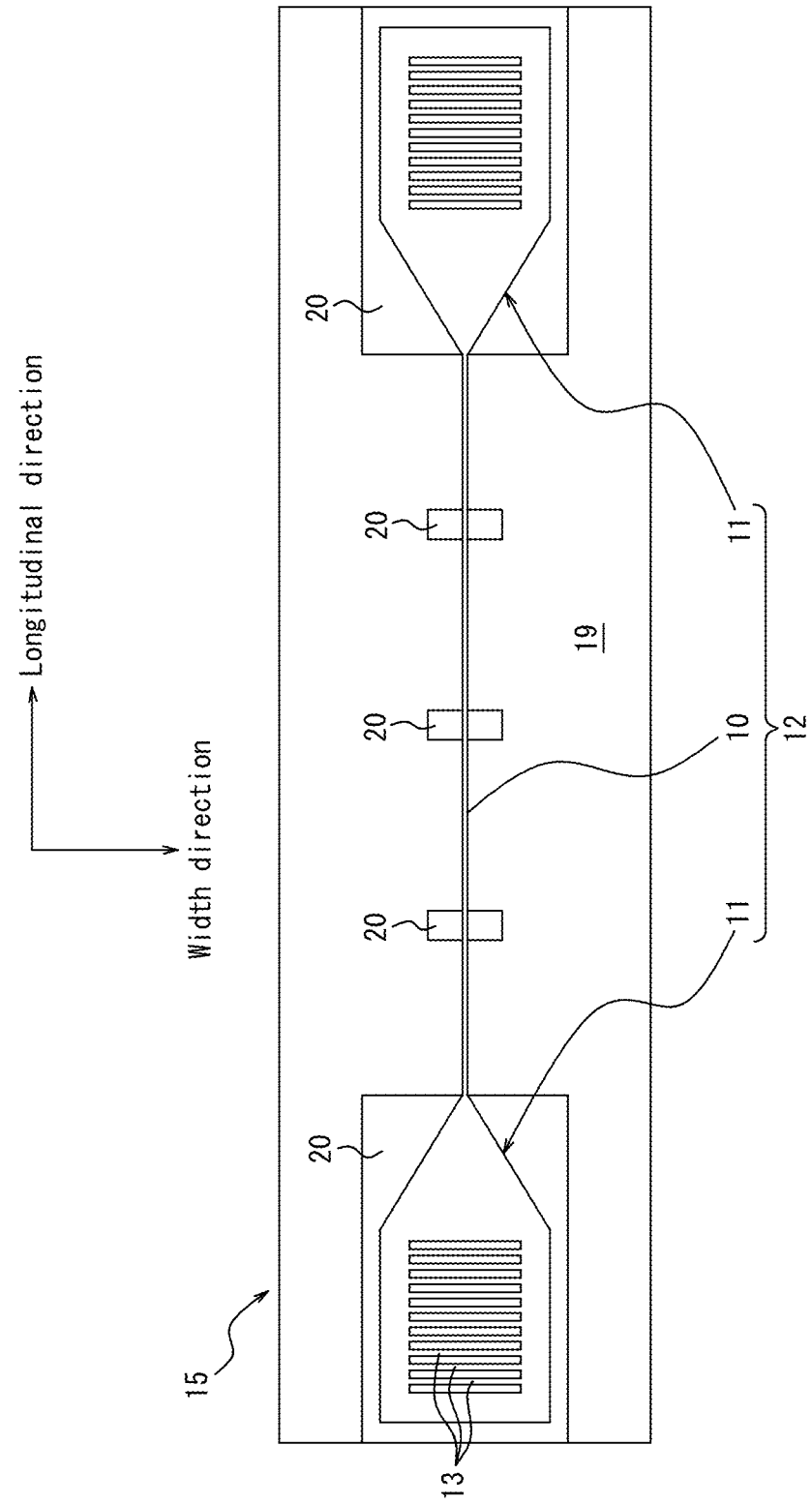
FIG. 3 is a plan view of the optical waveguide illustrated in FIG. 2, viewed from a side on which a light source or a photodetector is arranged.

FIG. 3 is a plan view of the optical waveguide 15 illustrated in FIG. 2 viewed from a side on which the light source 17 or the photodetector 18 is provided. As illustrated in FIG. 3, the substrate 19 has a plate-like shape by way of example, and the core layer 12 has a rectangular parallelepiped shape extending in the longitudinal direction, by way of example. The optical waveguide 15 includes a diffraction grating portion 11 (a grating coupler) formed at one end of the core layer 12 in the longitudinal direction, a diffraction grating portion 11 formed at the other end of the core layer 12 in the longitudinal direction, and a light propagating portion 10 that connects the diffraction grating portions 11 arranged at the ends.

As illustrated in FIG. 2, one of the diffraction grating portions 11 is arranged in an emission direction of the light source 17 (i.e., at a position vertically below the light source 17 in a state in which the optical waveguide 15 is arranged such that a stacking direction thereof is parallel to the vertical direction and, simultaneously, the substrate 19 faces vertically down, in the first embodiment). This diffraction grating portion 11 connects infrared radiation IR emitted from the light source 17 and the core layer 12. The other one of the diffraction grating portions 11 is arranged in a direction opposing the photodetector 18 (i.e., at a position vertically below the photodetector 18 in a state in which the optical waveguide 15 is arranged such that the stacking direction thereof is parallel to the vertical direction and, simultaneously, the substrate 19 faces vertically down, in the first embodiment). This diffraction grating portion 11 extracts infrared radiation IR having propagated through the core layer 12 and irradiates infrared radiation IR toward the photodetector 18.

As illustrated in FIG. 2, the light propagating portion 10 intermittently connects to the support 20 in the longitudinal direction and has gaps 21 without having a prescribed layer such as a clad layer between the light propagating portion 10 and the substrate 19 except for a region of the light propagating portion 10 in which the support 20 is provided. As illustrated in FIG. 3, on the other hand, each of the diffraction grating portions 11 includes a large diffraction grating corresponding to a light emitting surface of the light source 17 or a light receiving surface of the photodetector 18. The fine lines 13 forming the gratings and the fine line pattern have the respective lengths of 30 µm or more. The supports 20 are provided between the diffraction grating portions 11 and the substrate 19.

Here, the optical waveguide 15 according to the first embodiment will be described in more detail. Sensitivity of a sensor employing the ATR method can be improved by increasing an interaction region of the evanescent wave EW extended from the core layer 12 and a substance to be measured (i.e., by enlarging an exposed portion of the core layer 12), as illustrated in FIG. 2. However, when the support is not provided to the diffraction grating portion in the same manner as the configuration of the PTL 2, the fine lines that form the diffraction grating may bend and may not be formed with appropriate periods as designed. Such bending starts occurring when the fine lines have the respective lengths of 30 µm or more, becomes significant when the fine lines have the respective lengths of 50 µm or more, and becomes particularly significant when the fine lines have the respective lengths of 70 µm or more. Thus, it is preferred to fix the diffraction grating portion in which the fine lines have the respective lengths of 30 µm or more.

In the optical waveguide 15 according to the first embodiment, on the other hand, the support 20 is not provided at a position in the longitudinal direction of the light propagating portion 10, and the diffraction grating portions 11 which are portions to couple with the light emitting element and the light receiving element (i.e., the light source 17 and the photodetector 18) are provided with the respective supports 20 for supporting the core layer 12 with respect to the substrate 19. The supports 20 connected to the diffraction grating portions 11 function as the suppressing portions for suppressing deformation of the fine lines 13 formed in the diffraction grating portions 11, and thus enable a size increase of the diffraction grating portions 11 in which the diffraction gratings do not bend and remain the shape as designed. Note that the supports 20 connected to the diffraction grating portions 11 simply need to be provided at a position dividing the fine lines 13 into portions having the respective lengths of less than 70 μm in the extending direction of the fine lines 13, or at any position dividing the fine lines 13 in a case in which the fine lines 13 have the respective lengths of less than 70 μm. In the first embodiment, the supports 20 are provided throughout the extending direction.

Figure 4:
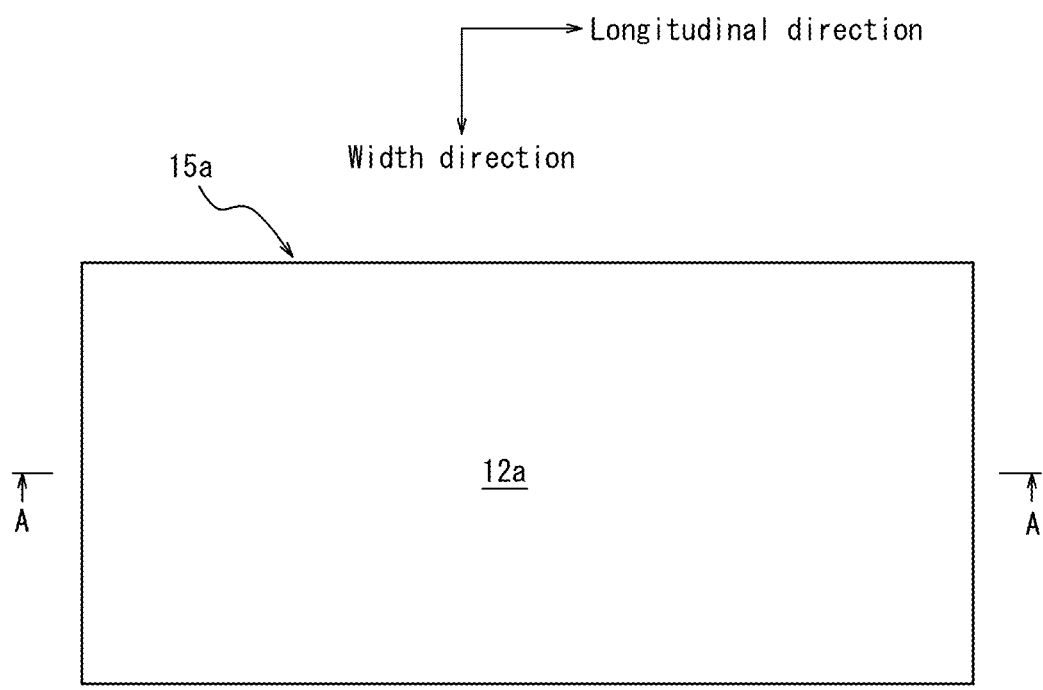
FIG. 4 is a plan view illustrating a portion of a SOI substrate for explaining a method for manufacturing the optical waveguide according to the first embodiment of the present disclosure.
Figure 5:
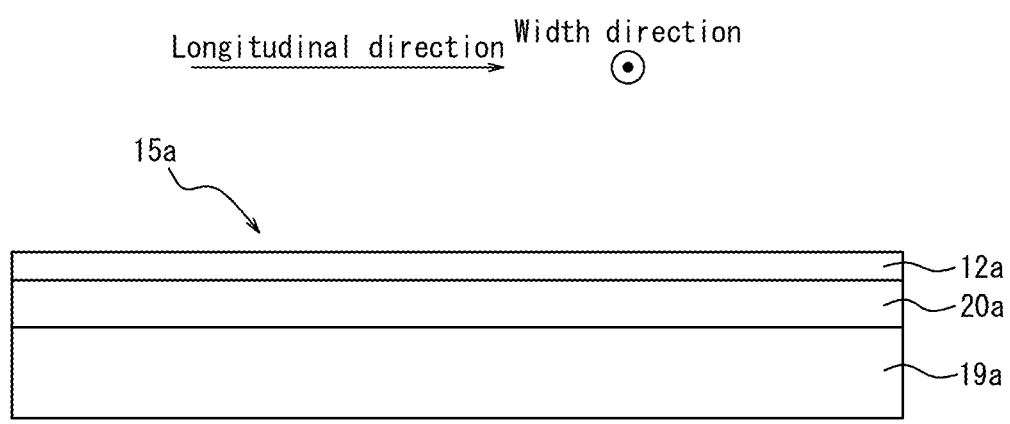
FIG. 5 is a cross-sectional end view of the SOI substrate, taken from line A-A in FIG. 4.
Figure 6:
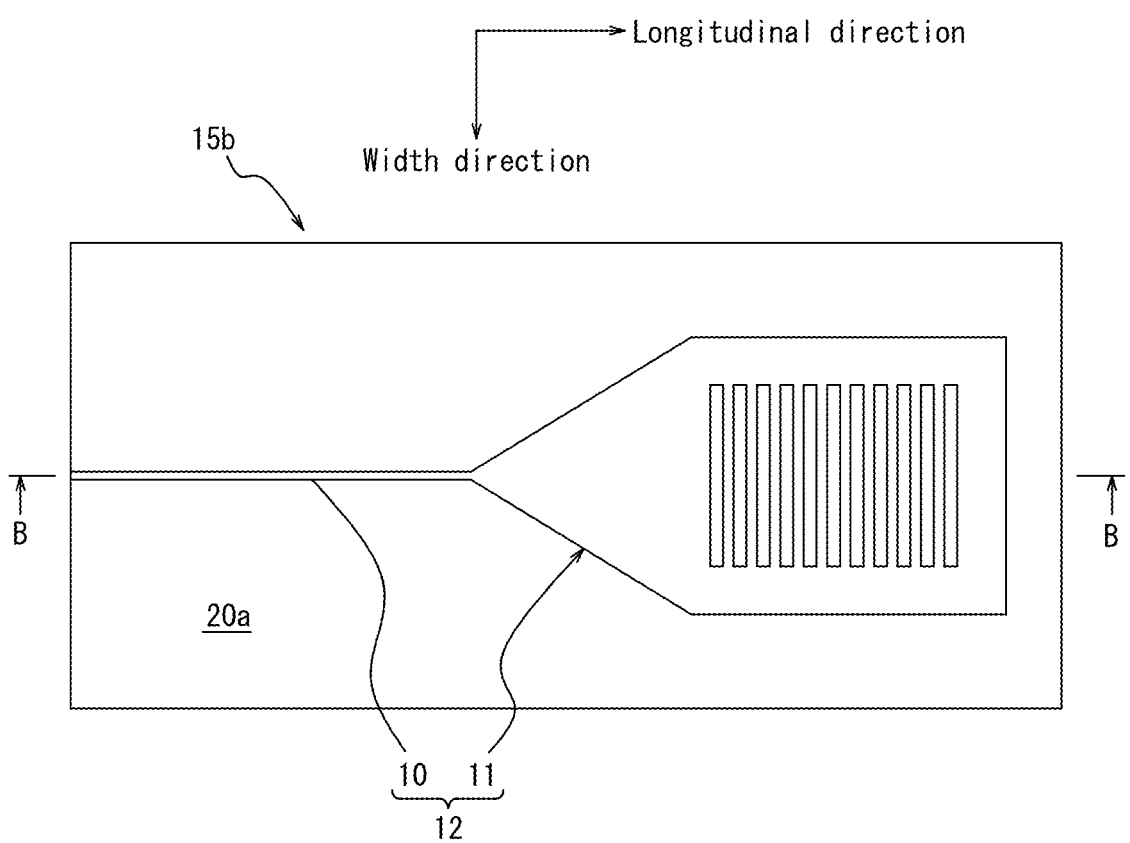
FIG. 6 is a plan view illustrating a portion of an optical waveguide main portion for explaining the method for manufacturing the optical waveguide according to the first embodiment of the present disclosure.
Figure 7:
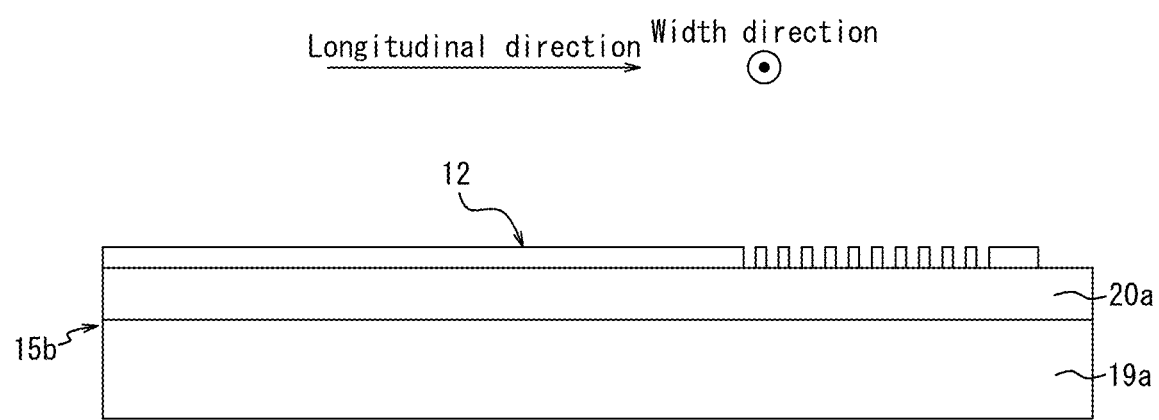
FIG. 7 is a cross-sectional end view of the optical waveguide main portion, taken from line B-B in FIG. 6.
Figure 8:
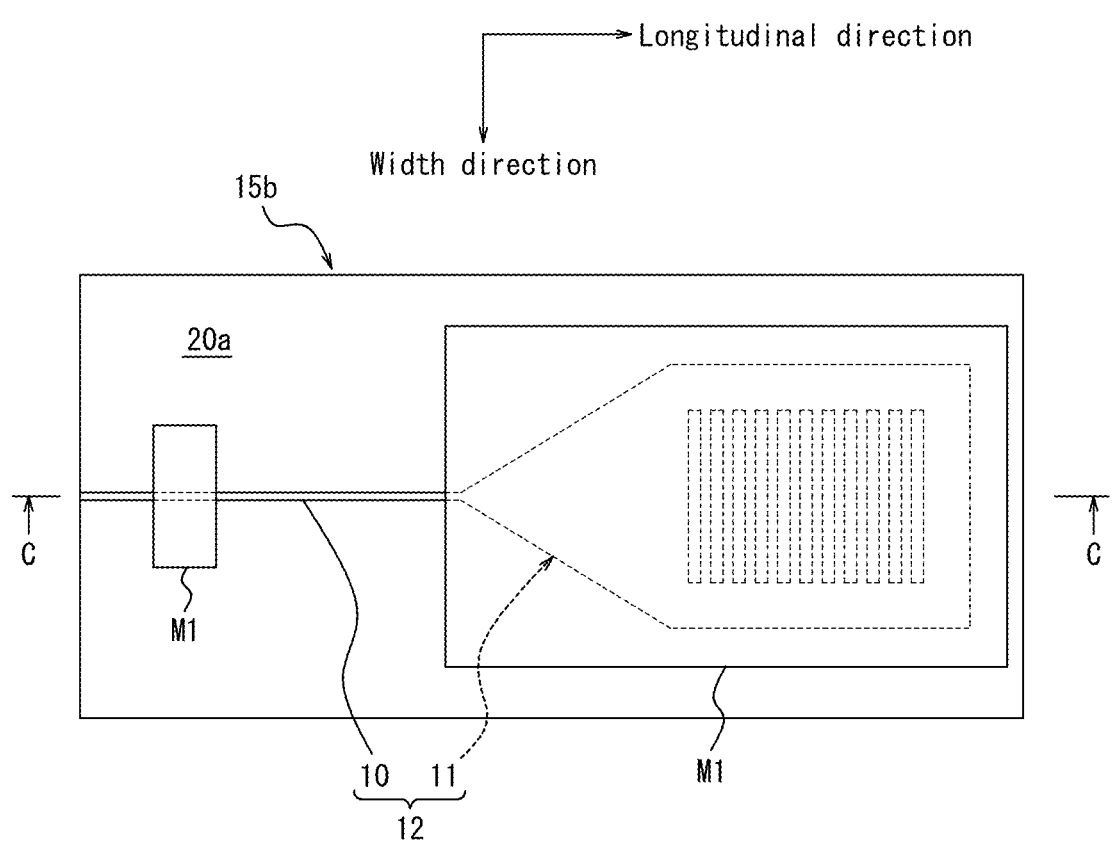
FIG. 8 is a plan view illustrating a portion of the optical waveguide main portion covered by a mask layer, for explaining the method for manufacturing the optical waveguide according to the first embodiment of the present disclosure.
Figure 9:
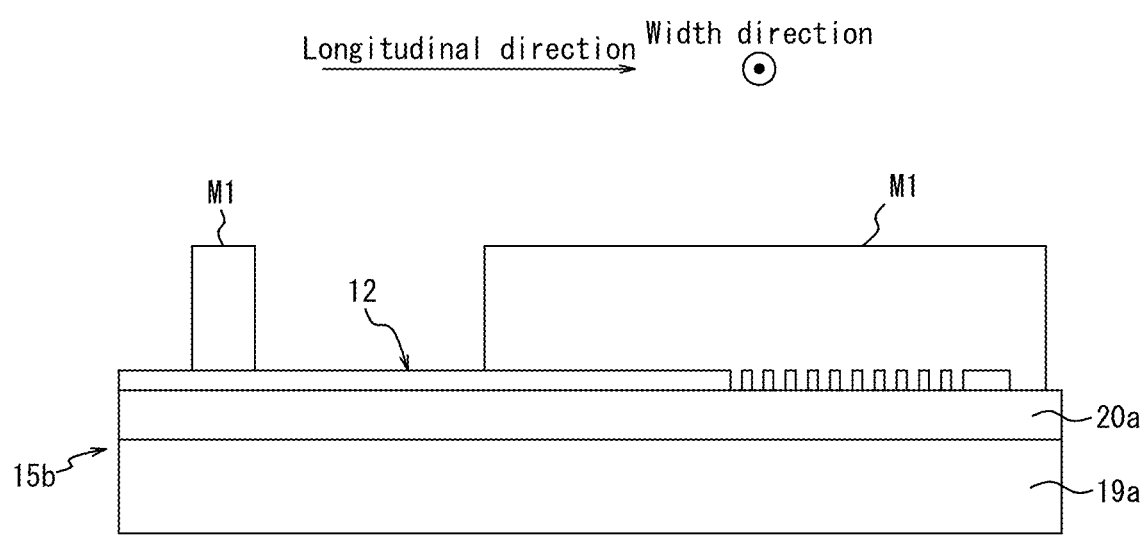
FIG. 9 is a cross-sectional end view of the optical waveguide main portion, taken from line C-C in FIG. 8.
Figure 10:
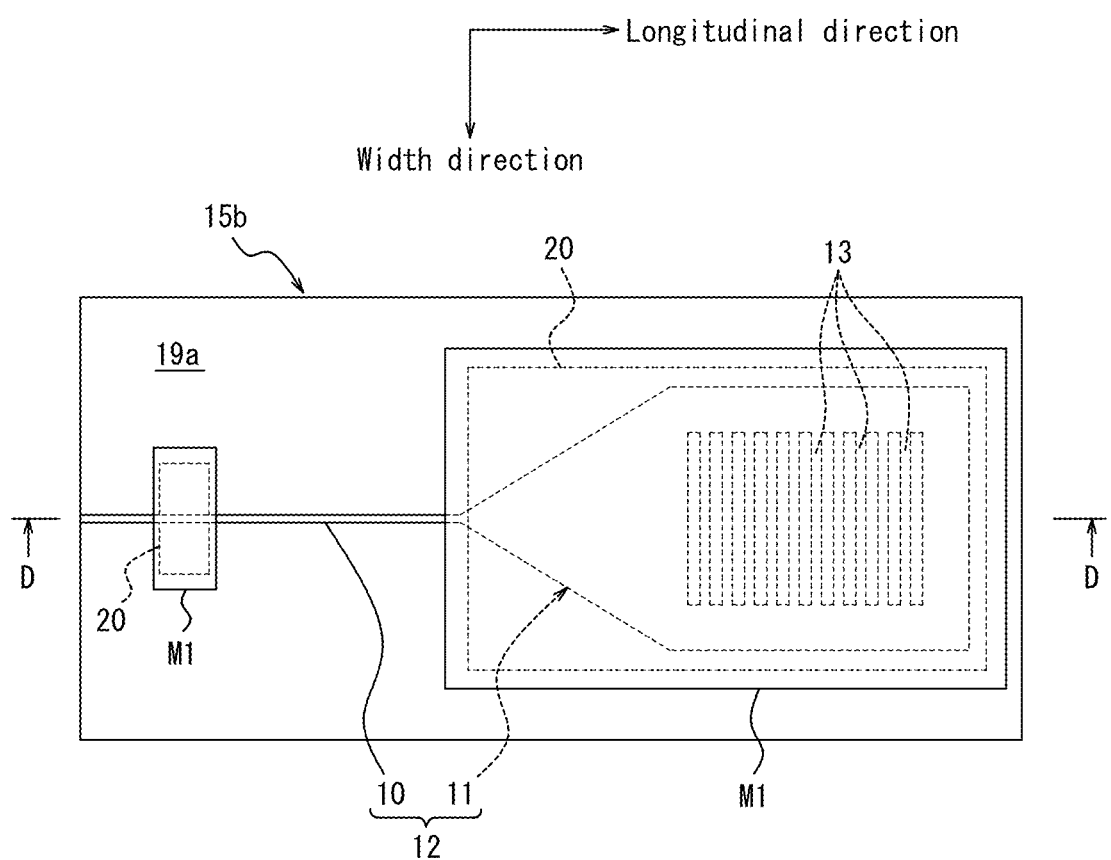
FIG. 10 is a plan view illustrating a portion of the optical waveguide main portion from which a BOX layer is partially removed, for explaining the method for manufacturing the optical waveguide according to the first embodiment of the present disclosure.
Figure 11:
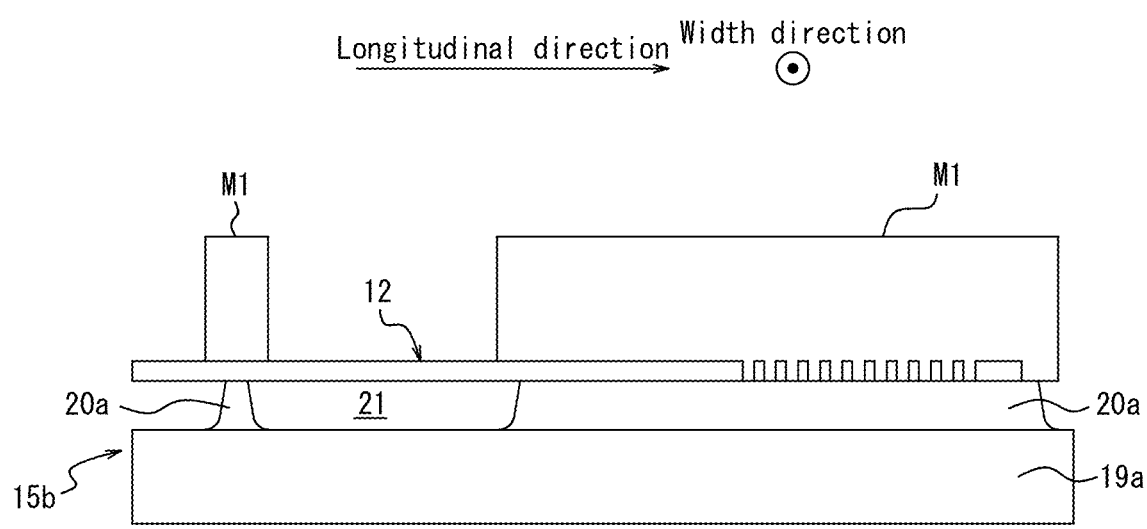
FIG. 11 is a cross-sectional end view of the optical waveguide main portion, taken from line D-D in FIG. 10.

Next, a method for manufacturing the optical waveguide 15 according to the first embodiment will be described with reference to FIG. 4 to FIG. 11. FIG. 4 is a plan view of a manufacturing process of the optical waveguide 15. FIG. 5 is a cross-sectional end view of the manufacturing process of the optical waveguide 15 taken from line A-A illustrated in FIG. 4. FIG. 6 is a plan view of the manufacturing process of the optical waveguide 15. FIG. 7 is a cross-sectional end view of the manufacturing process of the optical waveguide 15 taken from line B-B illustrated in FIG. 6. FIG. 8 is a plan view of the manufacturing process of the optical waveguide 15. FIG. 9 is a cross-sectional end view of the manufacturing process of the optical waveguide 15 taken from line C-C illustrated in FIG. 8. FIG. 10 is a plan view of the manufacturing process of the optical waveguide 15, and FIG. 11 is a cross-sectional end view of the manufacturing process of the optical waveguide 15 taken from line D-D illustrated in FIG. 10.

As illustrated in FIG. 4 and FIG. 5, first, a $SiO_2$ film is formed on either one of, or both of, a support substrate 19a that is formed from silicon and to serve as the substrate 19, and an active substrate 12a that is formed from silicon and in which the core layer 12 is to be formed. The support substrate 19a and the active substrate 12a are stuck together via the $SiO_2$ film arranged therebetween, and subjected to thermal process to be attached to each other. Then, the active substrate 12a is grounded, polished, or the like to adjust the film thickness thereof. In this way, a SOI substrate 15a having a "silicon-insulating layer-silicon" structure, in which a BOX layer 20a is formed on the support substrate 19a and the active substrate 12a is formed on the BOX layer 20a, is formed.

Next, the core layer 12 of the SOI substrate 15a is subjected to lithography and etching, such that the core layer 12 that includes the light propagating portion 10 and the diffraction grating portion 11 is formed. In this way, an optical waveguide main portion 15b that includes the support substrate 19a having the plate-like shape, the BOX layer 20a having the plate-like shape formed on the support substrate 19a, and the core layer 12 having a quadrangular prism shape formed on a portion of the BOX layer 20a is obtained, as illustrated in FIG. 6 and FIG. 7.

Next, mask layers M1 for covering portions of the core layer 12 and the BOX layer 20a are formed, as illustrated in FIG. 8 and FIG. 9. The mask layers M1 are arranged so that the mask layers M1 cover regions of the BOX layer 20a which are desired to remain and function as the supports 20.

In the first embodiment, for example, a mask layer M1 is arranged so that the mask layers M1 cover a region with width wider than the width of the light propagating portion 10 and with length longer than a designed longitudinal length of the support 20, centering a position to form the support 20 in the longitudinal direction of the light propagating portion 10. Further, for example, in the first embodiment, the mask layer M1 is arranged covering a rectangular region larger than the entire diffraction grating portion 11. Each of the mask layers M1 may be formed from a photoresist or may be a hard mask such as a silicon nitride film.

Next, a portion of the BOX layer 20a of the optical waveguide main portion 15a is removed by performing wet etching or the like using the mask layers M1 as masks. By performing etching with isotropic components, a portion of the BOX layer 20a under the light propagating portion 10 where the core layer 12 is narrow is removed, and portions of the BOX layer 20a under the mask layers M1 remain and serve as the support 20. In this way, a structure in which the gap 21 is formed between the core layer 12 and the support substrate 19a at a position in the longitudinal direction of the light propagating portion 10, and the entire diffraction grating 11 in which the fine lines 13 having a continuous length of 30 μm or more are formed is fixedly supported by the support 20 can be obtained, as illustrated in FIG. 10 and FIG. 11.

Next, by etching the mask layers M1, the optical waveguide main portion 15b having a configuration corresponding to the optical waveguide 15 of the first embodiment as illustrated in FIG. 2 and FIG. 3 can be obtained.

Then, the support substrate 19a is cut in a predetermined region to separate the optical waveguide main portion 15b. In this way, the optical waveguide 15 (see FIG. 3) is completed, in which the gap 21 is formed between the core layer 12 and the substrate 19 at a position in the longitudinal direction of the light propagating portion 10, and the entire diffraction grating portion 11 formed of the fine lines 13 having the length of 30 μm or more is fixed.

Further, the light source 17 is arranged in such a manner as to be able to cause infrared radiation IR to enter the corresponding one of the diffraction grating portions 11 (the grating coupler) of the optical waveguide 15, and the photodetector 18 is arranged in such a manner as to be able to receive infrared radiation IR having exited from the corresponding one of the diffraction grating portions 11 (the grating coupler), as illustrated in FIG. 2. Thus, the optical concentration measuring apparatus 14 is completed.

Second Embodiment

The second embodiment is similar to the first embodiment, except for the supports formed under the diffraction grating portions of the first embodiment. Thus, descriptions of the same constituent elements will be omitted. Hereinafter, the constituent elements having the same configurations as those of the first embodiment will be denoted by the same reference signs. In the second embodiment, the diffraction grating portions are partially supported by the support, rather than being entirely supported by the supports as described in the first embodiment.

Figure 12:
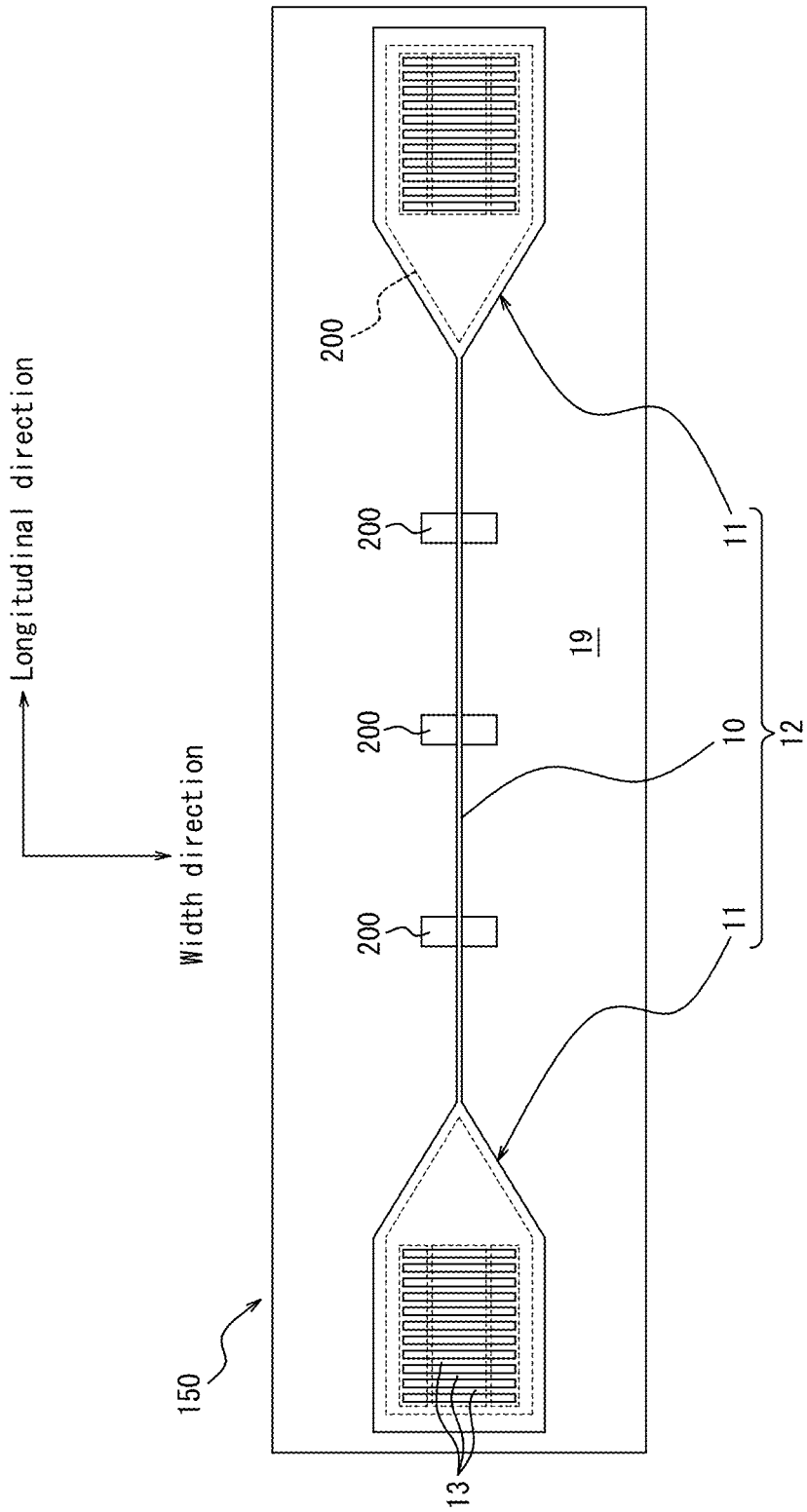
FIG. 12 is a plan view illustrating an optical waveguide according to a second embodiment of the present disclosure, viewed from a side on which a light source or a photodetector is arranged.

In the second embodiment, in the diffraction grating portions 11 of an optical waveguide 150, supports 200 are intermittently provided at positions dividing the fine lines 13 into portions having the respective lengths of less than 70 μm, or at any positions dividing the fine lines 13 in a case in which the fine lines 13 have the respective lengths of less than 70 μm, as illustrated in FIG. 12. In other words, the maximum length of the fine lines 13 in a region (i.e., a second region) where the supports 200 are not provided between the core layer 12 and the substrate 19 is less than 70 µm. Accordingly, the supports 200 function as suppressing portions for suppressing deformation of the fine lines 13 formed in the diffraction grating portion 11. In this way, the fine lines 13 are each suppressed from having a continuous length of 70 µm or more, which may significantly bend unless secured. As a result, even when the diffraction grating portion 11 is large in size, the diffraction grating that is appropriately formed as designed and does not bend can be formed.

Figure 13:
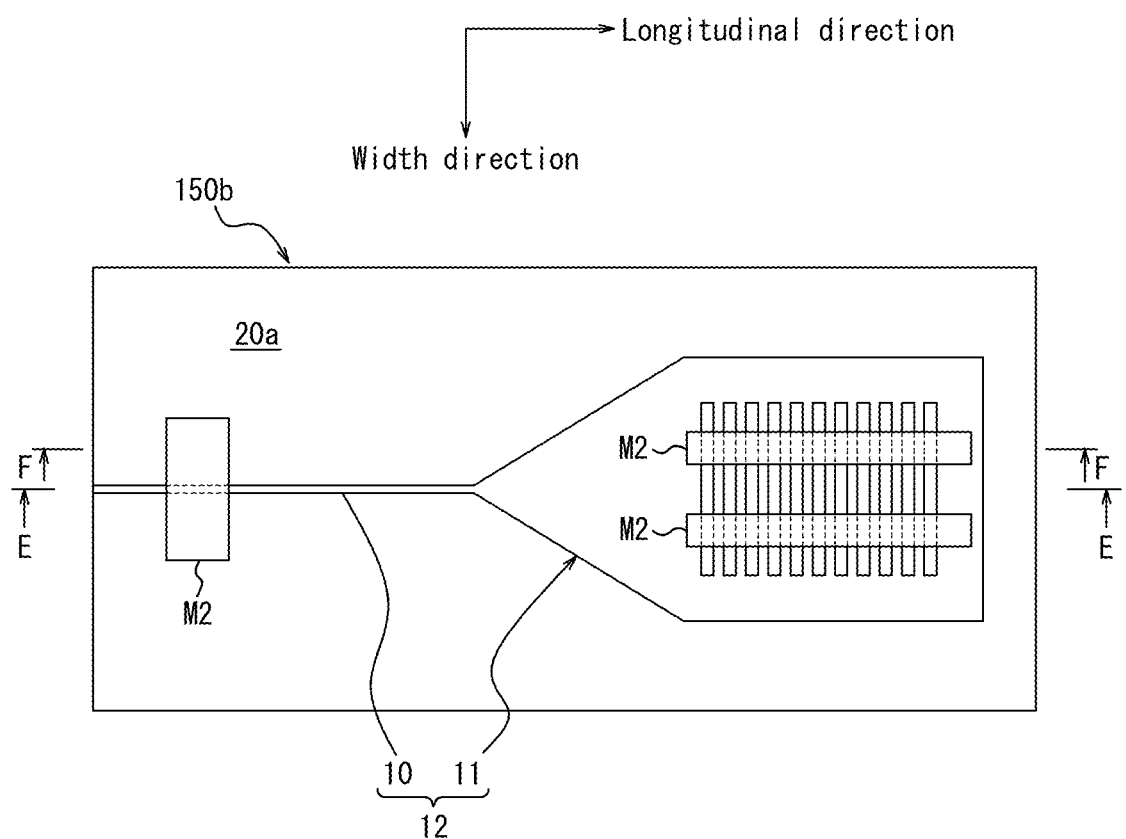
FIG. 13 is a plan view illustrating a portion of an optical waveguide main portion covered by a mask layer, for explaining a method for manufacturing the optical waveguide according to the second embodiment of the present disclosure.
Figure 14:
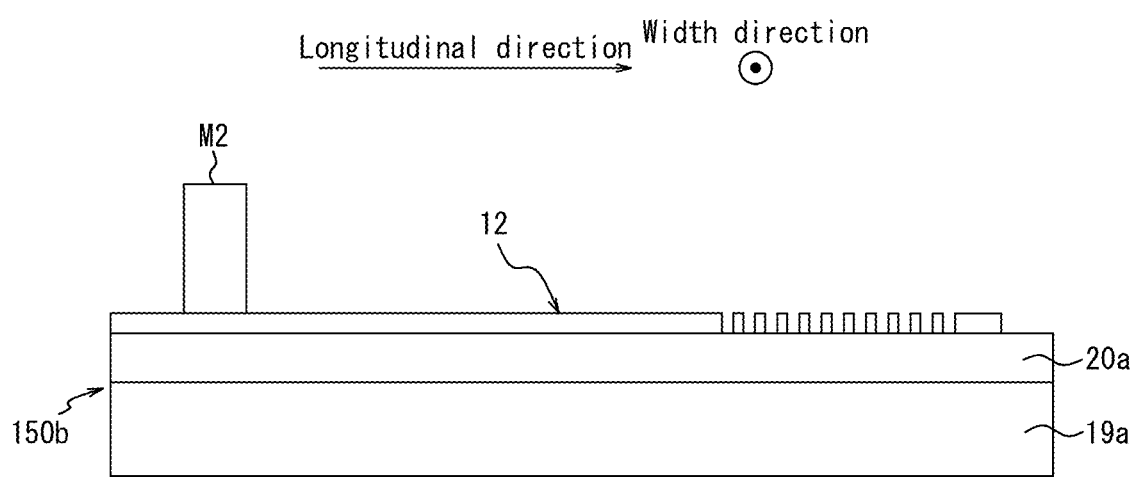
FIG. 14 is a cross-sectional end view of the optical waveguide main portion, taken from line E-E in FIG. 13.
Figure 15:
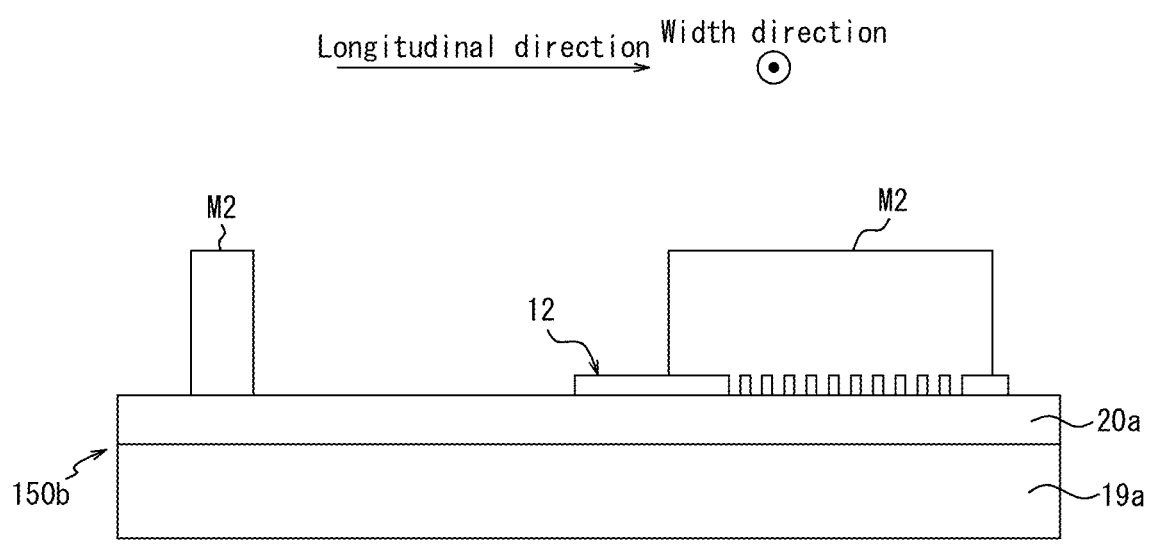
FIG. 15 is a cross-sectional end view of the optical waveguide main portion, taken from line F-F in FIG. 13.
Figure 16:
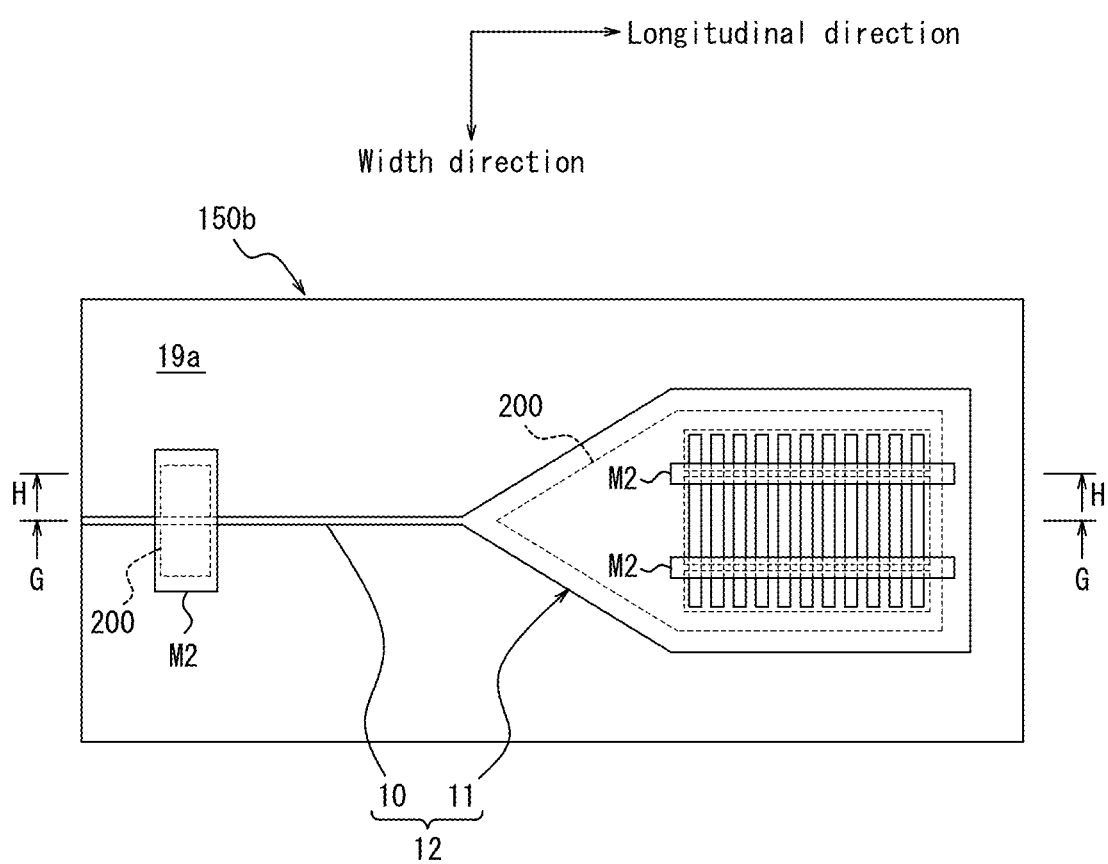
FIG. 16 is a plan view illustrating a portion of the optical waveguide main portion from which a BOX layer is partially removed, for explaining the method for manufacturing the optical waveguide according to the second embodiment of the present disclosure.
Figure 17:
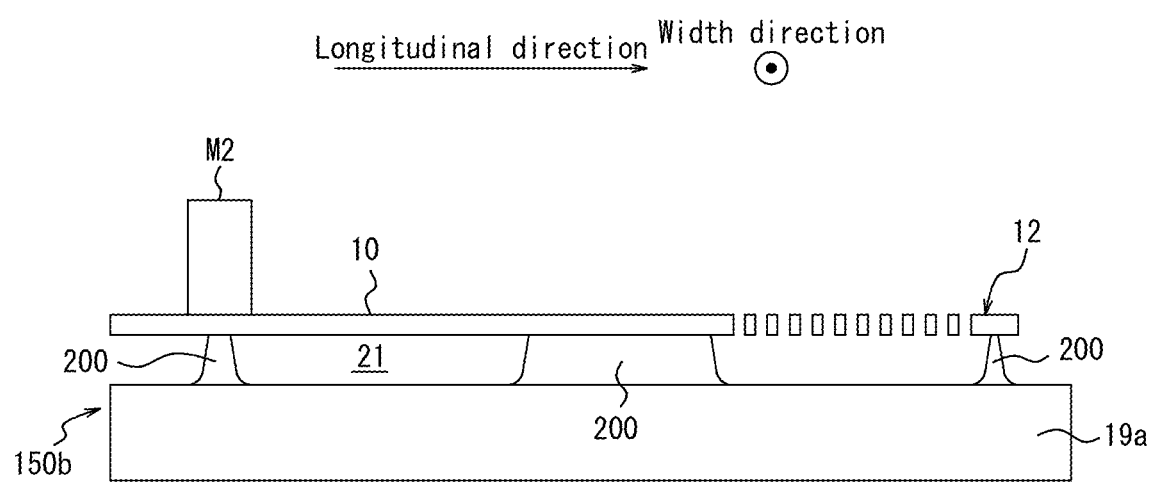
FIG. 17 is a cross-sectional end view of the optical waveguide main portion, taken from line G-G in FIG. 16.
Figure 18:
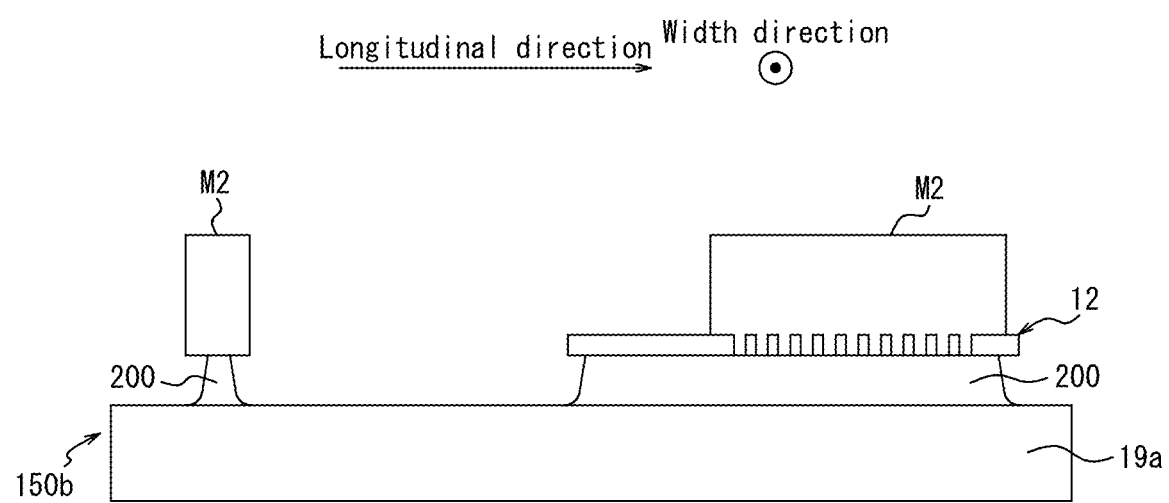
FIG. 18 is a cross-sectional end view of the optical waveguide main portion, taken from line H-H in FIG. 16.

Next, a method for manufacturing the optical waveguide 150 according to the second embodiment will be described with reference to FIG. 13 to FIG. 18. FIG. 13 is a plan view of a manufacturing process of the optical waveguide 150. FIG. 14 is a cross-sectional end view of the manufacturing process of the optical waveguide 150 taken from line E-E illustrated in FIG. 13. FIG. 15 is a cross-sectional end view of the manufacturing process of the optical waveguide 150 taken from line F-F illustrated in FIG. 13. FIG. 16 is a plan view of the manufacturing process of the optical waveguide 150. FIG. 17 is a cross-sectional end view of the manufacturing process of the optical waveguide 150 taken from line G-G illustrated in FIG. 16. FIG. 18 is a cross-sectional end view of the optical waveguide 150 taken from line H-H illustrated in FIG. 16.

In the second embodiment, after the step of forming the core layer 12 on the BOX layer 20a in the first embodiment (see FIGS. 6 and 7), mask layers M2 for covering portions of the core layer 12 and the BOX layer 20a of an optical waveguide main portion 150b are formed, as illustrated in FIG. 13. In the second embodiment, the mask layers M2 are intermittently formed at positions dividing the fine lines 13 forming the diffraction grating into portions having the respective lengths of less than 70 µm, or at any positions dividing the fine lines 13 in a case in which the fine lines 13 have the respective lengths of less than 70 µm, as illustrated in FIG. 13 to FIG. 15, rather than covering the entire diffraction grating portions 11. Each of the mask layers M2 may be formed from a photoresist or may be a hard mask such as a silicon nitride film.

Next, portions of the BOX layer 20a of the optical waveguide main portion 150b is removed by wet etching or the like using the mask layers M2 as masks. By performing etching with isotropic components, a portion of the BOX layer 20a under the light propagating portion 10 where the core layer 12 is narrow is removed, and portions of the BOX layer 20a under the mask layers M2 where the core layer 12 is wide remains and serve as the supports 200. In this way, a structure as illustrated in FIG. 16 to FIG. 18 can be obtained, in which the gaps 21 are formed between the core layer 12 and the support substrate 19a at position in the longitudinal direction of the light propagating portion 10, and the diffraction grating portions 11 formed of the fine lines 13 having a continuous length of 30 µm or more are fixedly supported by the support 200 at the position dividing the fine lines 13 into portions having the respective lengths of less than or the diffraction grating portions 11 formed of the fine lines 13 having the respective lengths of less than 70 µm are fixedly supported by the support 200 at any position dividing the fine lines 13.

Next, by etching the mask layers M2, the optical waveguide main portion 15b having the structure corresponding to the optical waveguide 15 of the second embodiment can be obtained, as illustrated in FIG. 12.

Then, the support substrate 19a is cut in a predetermined region to separate the optical waveguide main portion 150b. Thus, the optical waveguide 150 (see FIG. 12) is completed, in which the gaps 21 are formed between the light propagating portion 10 and the substrate 19 at a position in the longitudinal direction of the light propagating portion 10, and the diffraction grating portion 11 is fixed at the position dividing the fine lines 13 having the respective lengths of 30 µm or more into portions having the respective lengths of less than 70 µm, or at any position dividing the fine lines 13 in a case in which the fine lines 13 have the respective lengths of less than 70 µm.

Further, in a manner similar to the first embodiment (see FIG. 2), the light source 17 is arranged in such a manner as to be able to cause infrared radiation IR to enter the corresponding one of the diffraction grating portions 11 (the grating coupler) of the optical waveguide 150, and the photodetector 18 is arranged in such a manner as to be able to receive infrared radiation IR having exited from the corresponding one of the diffraction grating portions 11 of the optical waveguide 150. Thus, the optical concentration measuring apparatus 14 is completed.

Third Embodiment

The third embodiment is the same as the second embodiment, except for the shape of the light propagating portion at the position where the support is provided and the shape of the fine lines of the diffraction grating portions. Thus, descriptions of the same constituent elements will be omitted. Hereinafter, constituent elements the same as those of the first embodiment or the second embodiment will be denoted by the same reference signs. In the third embodiment, the core layer is partially supported in a manner similar to the second embodiment. However, the third embodiment is different from the second embodiment, in terms of using the core layer to form the support.

Figure 19:
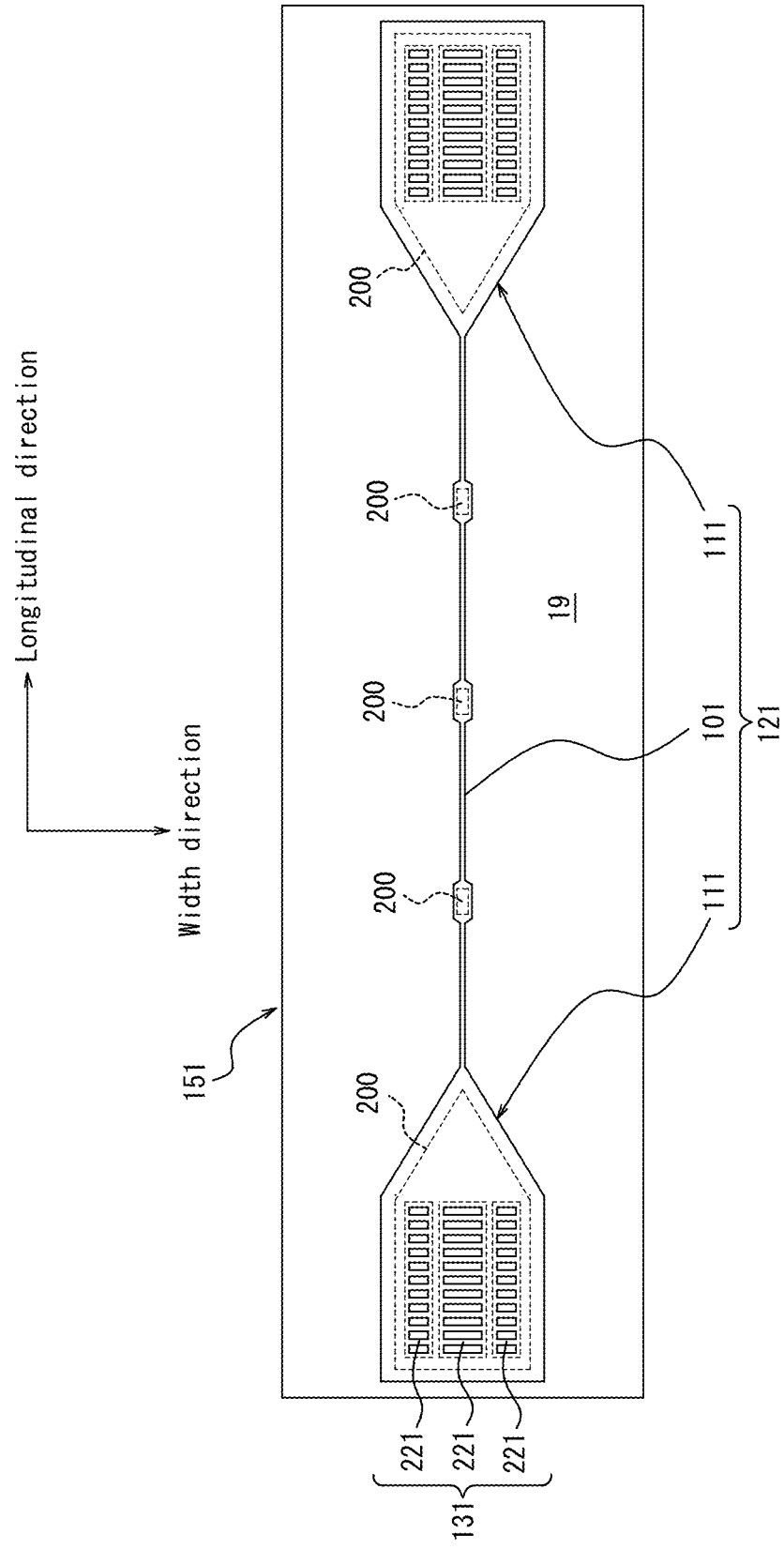
FIG. 19 is a plan view illustrating an optical waveguide according to a third embodiment of the present disclosure, viewed from a side on which a light source or a photodetector is arranged.
Figure 20:
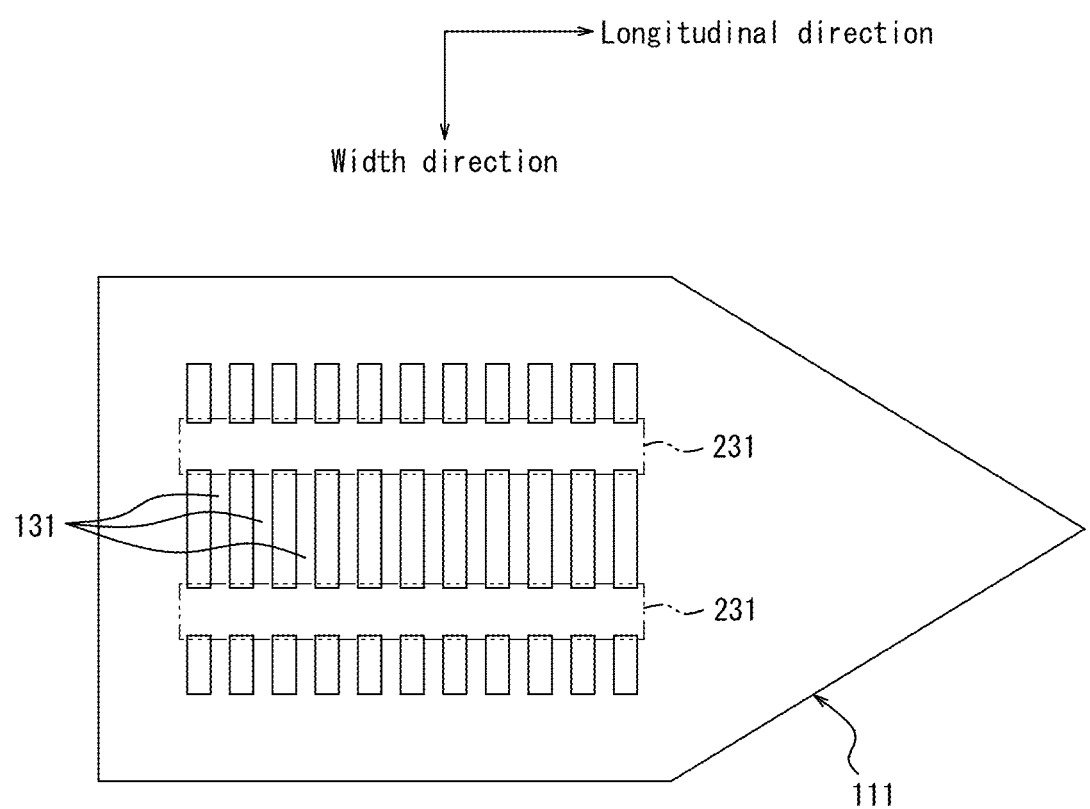
FIG. 20 is an enlarged view of a diffraction grating portion illustrated in FIG. 19.

In the third embodiment, as illustrated in FIG. 19 and FIG. 20, in a diffraction grating portion 111 of an optical waveguide 151, partitions 231 and the supports 200 are intermittently formed at positions dividing fine lines 131 that are formed of a plurality of fine line subsets 221 and have a total length of 30 µm or more in the extending direction, that is, at positions dividing the fine lines 131 having an intermittent total length of 30 µm or more into portions having the respective lengths of less than 70 µm, or any position dividing the fine lines 131 in a case in which the fine lines 131 have the respective lengths of less than 70 µm. Note that the partitions 231 are portions where the openings or the grooves are not formed at the position that is along the extending direction of the fine lines 131 and dividing a plurality of openings defining the fine lines 131. The supports 200 and the partitions 231 are formed such that the respective lengths of the portions of the fine lines 131 that are not supported by the supports 200 are less than 70 µm, or less than the original lengths of the fine lines 131 in a case in which the fine lines 131 have the respective lengths of less than 70 µm. Thus, the supports 200 and the partitions 231 function as the suppressing portions for suppressing deformation of the fine lines 131 formed in the diffraction grating portion 111. In this way, the fine lines 131 are each suppressed from having a continuous length of 70 µm or more, which may significantly bend unless fixed. As a result, even when the diffraction grating portion 111 is large in size, the diffraction grating that is appropriately formed as designed and does not bend can be formed.

Figure 21:
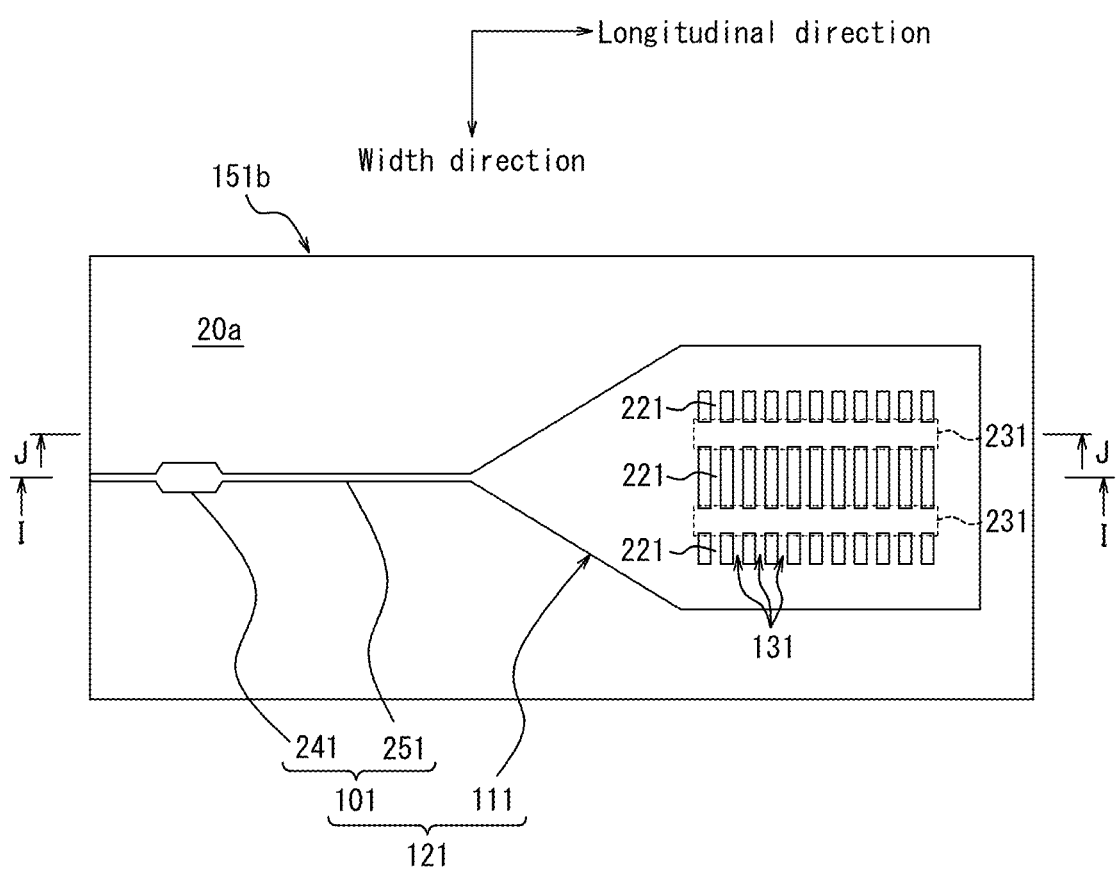
FIG. 21 is a plan view illustrating a portion of an optical waveguide main portion, for explaining a method for manufacturing the optical waveguide according to the third embodiment of the present disclosure.
Figure 22:
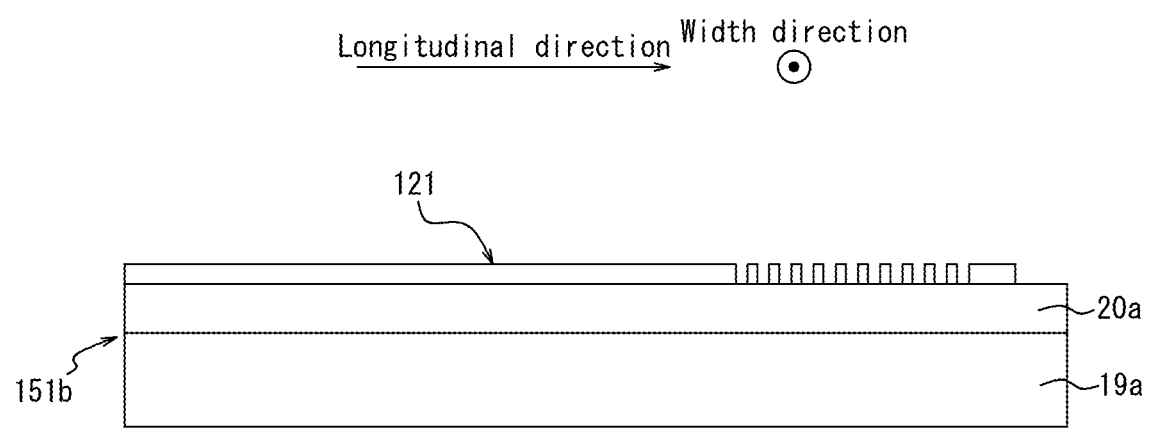
FIG. 22 is a cross-sectional end view of the optical waveguide main portion, taken from line I-I in FIG. 21.
Figure 23:
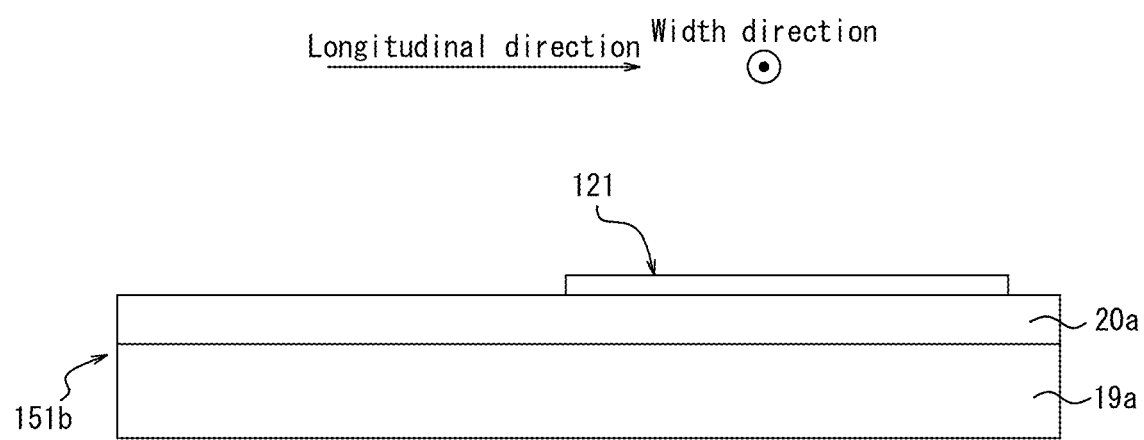
FIG. 23 is a cross-sectional end view of the optical waveguide main portion, taken from line J-J in FIG. 21.
Figure 24:
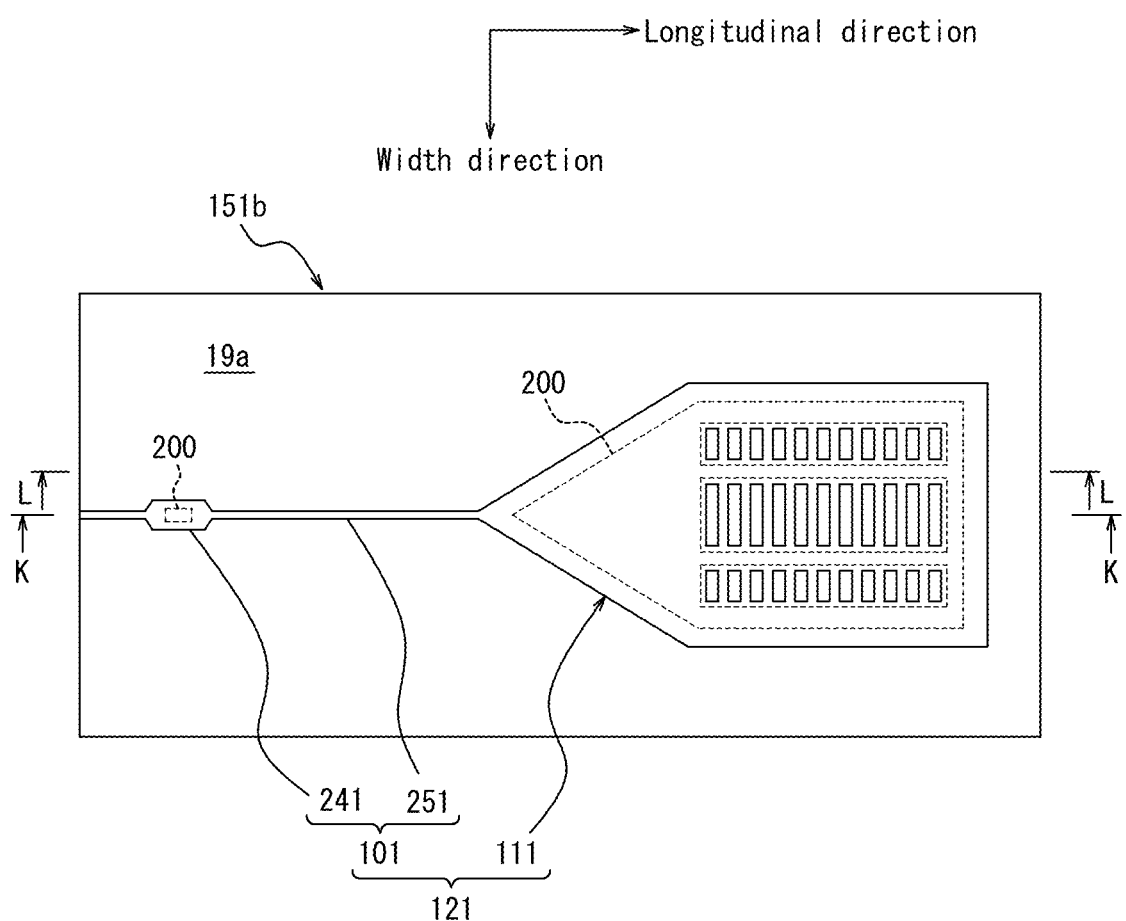
FIG. 24 is a plan view illustrating a portion of the optical waveguide main portion from which a BOX layer is partially removed, for explaining the method for manufacturing the optical waveguide according to the third embodiment of the present disclosure.
Figure 25:
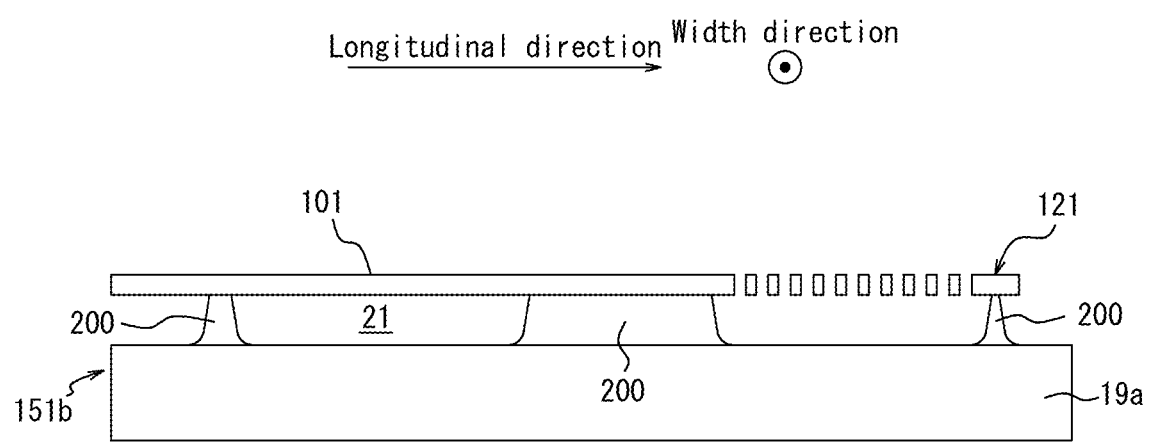
FIG. 25 is a cross-sectional end view of the optical waveguide main portion, taken from line K-K in FIG. 24.
Figure 26:
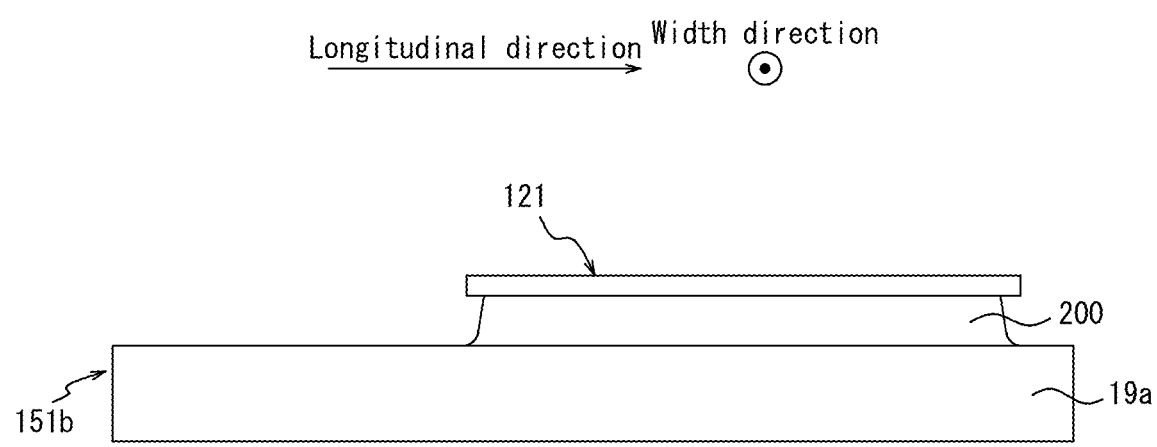
FIG. 26 is a cross-sectional end view of the optical waveguide main portion, taken from line L-L in FIG. 24.

Next, a method for manufacturing the optical waveguide 151 according to the third embodiment will be described with reference to FIG. 21 to FIG. 26. FIG. 21 is a plan view of a manufacturing process of the optical waveguide 151. FIG. 22 is a cross-sectional end view of the manufacturing process of the optical waveguide 151 taken from line I-I illustrated in FIG. 21. FIG. 23 is a cross-sectional end view of the manufacturing process of the optical waveguide 151 taken from line J-J illustrated in FIG. 21. FIG. 24 is a plan view of the manufacturing process of the optical waveguide 151. FIG. 25 is a cross-sectional end view of the manufacturing process of the optical waveguide 151 taken from line K-K illustrated in FIG. 24. FIG. 26 is a cross-sectional end view of the manufacturing process of the optical waveguide 151 taken from line L-L illustrated in FIG. 24.

In the third embodiment, after the step of forming the SOI substrate 15a of the first embodiment (see FIG. 4 and FIG. 5), a wide portion 241 of the light propagating portion 101 where the support 200 is formed, and a narrow portion 251 forming the remaining area of the light propagating portion 101 are formed, as illustrated in FIG. 21 to FIG. 23. The width of the wide portion 241 is wider than the width of the narrow portion 251. In the diffraction grating portion 111, the fine lines 131 forming the diffraction grating, and partitions 321 dividing the fine lines 131 into the fine line subsets 221 are formed.

Next, a portion of the BOX layer 20a of the optical waveguide main portion 151b is removed by performing wet etching or the like using a portion of the core layer 121 as a mask layer. By performing etching with isotropic components, portions of the BOX layer 20a under the narrow portion of the core layer 121, such as the narrow portion 251 and a portion in the vicinity of the openings between the fine lines 131, are removed, while portions of the BOX layer 20a under the wide portion of the core layer 121, such as the wide portion 241 and a portion remote from the openings, remain and serve as the supports 200. In this way, the core layer 121 are formed as illustrated in FIG. 24 to FIG. 26, in which the gaps 21 are formed between the light propagating portion 10 and the support substrate 19a at portions in the longitudinal direction of the light propagating portion 10, and the core layer 121 is fixedly supported by the supports 200 at the position dividing the fine lines 131 that are formed in the diffraction grating portion 111 and have respective continuous lengths of 30 μm or more into portions having the respective lengths of less than 70 μm, or at any positions dividing the fine lines 131 into smaller portions in a case in which the fine lines 131 have the respective lengths of less than 70 μm. Further, the partitions 231 are formed such that each of the fine line subsets 221 has the length of less than 70 μm and a total length of a plurality of the fine line subsets 221 arranged in the extending direction is 30 μm or more.

The manufacturing method according to the third embodiment as described above enables the formation of the supports 200 in an intermittent manner with respect to the core layer 121 without using the mask layers M1 used in the first embodiment and the mask layer M2 used in the second embodiment, and thus can simplify the manufacturing process.

Then, the support substrate 19a is cut in a predetermined region to separate the optical waveguide main portion 151b. Thus, the optical waveguide 151 is completed, in which the gap 21 is formed between the light propagating portion 10 and the substrate 19 at the position in the longitudinal direction of the light propagating portion 10, and the plurality of fine line subsets 221 are arranged in the extending direction and divided by the partitions 231, as illustrated in FIG. 19.

Further, in a manner similar to the first embodiment (see FIG. 2), the light source 17 is arranged in such a manner as to be able to cause infrared radiation IR to enter the corresponding one of the diffraction grating portions 111 (the grating coupler) of the optical waveguide 151, and the photodetector 18 is arranged in such a manner as to be able to receive infrared radiation IR having exited from the corresponding one of the diffraction grating portions 111 (the grating coupler) of the optical waveguide 151. Thus, the optical concentration measuring apparatus 14 is completed.

Fourth Embodiment

A fourth embodiment is the same as the third embodiment, except for the configuration of the fine lines in the diffraction grating portion. Thus, descriptions of the same constituent elements will be omitted. Hereinafter, constituent elements the same as those of the first embodiment, the second embodiment, or the third embodiment will be denoted by the same reference signs. In the fourth embodiment, the fine line pattern of the diffraction grating portion is formed by performing half etching, in a manner different from the first, second, and third embodiments in which the fine line pattern is formed by performing fully etching.

Figure 27:
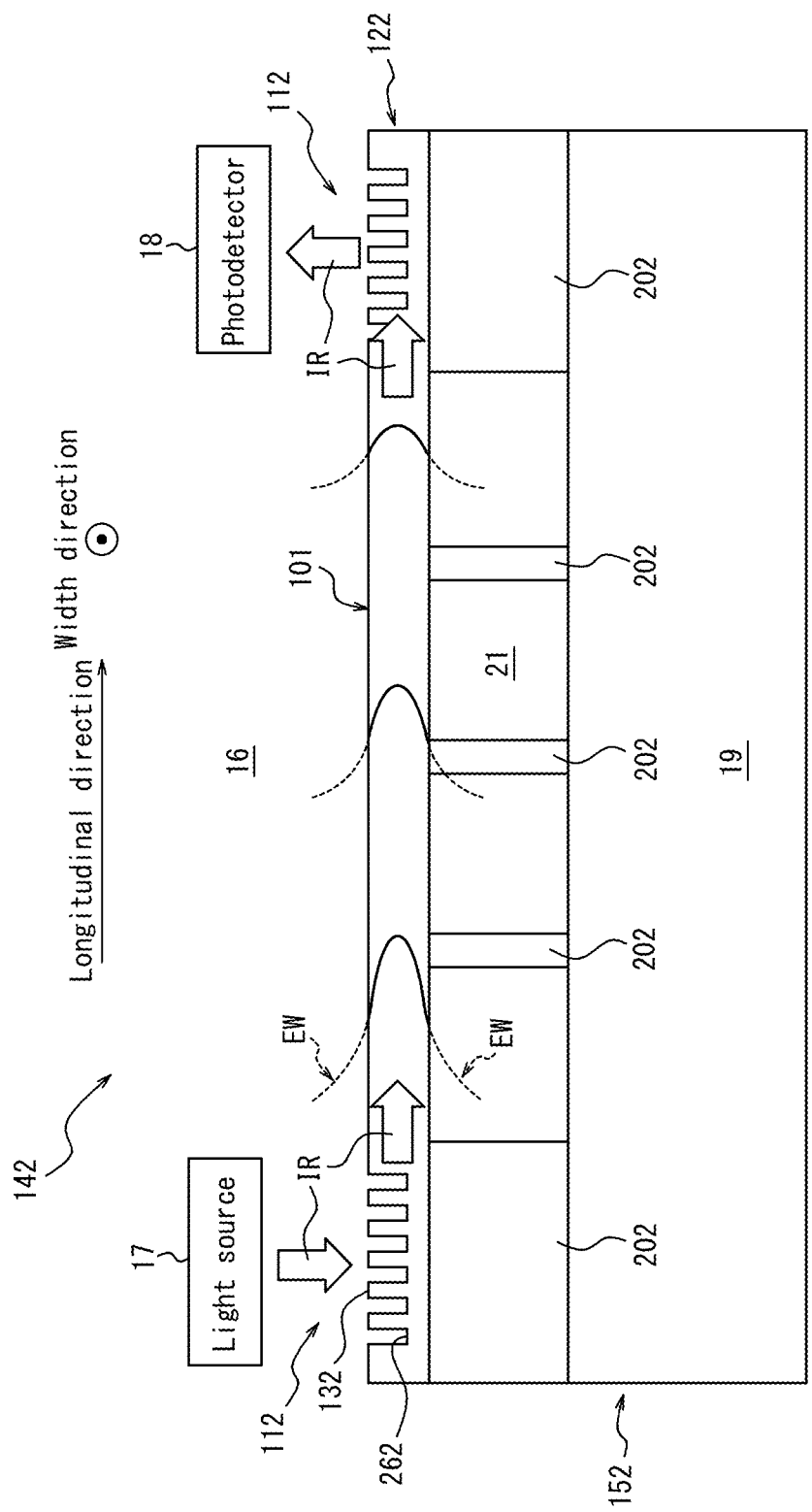
FIG. 27 is a diagram illustrating a schematic configuration of an optical waveguide according to a fourth embodiment of the present disclosure and an optical concentration measuring apparatus that includes the optical waveguide.

In the fourth embodiment, fine lines 132 of diffraction grating portions 112 are formed by performing half etching as illustrated in FIG. 27, which will be described later. Thus, the optical waveguide 152 having a configuration in which all the fine lines are connected to one another because of the core layer 122 remained after half etching is obtained. In the fourth embodiment, in other words, the fine lines 132 are formed by grooves 262, rather than by openings. Thus, the grooves 262 that are remained between the fine lines 132 adjacent to each other after half etching serve as the mask layers when supports 202 are formed, whereby the supports 202 are provided under the diffraction grating portions 112. The supports 202 function as the suppressing portions for suppressing deformation of the fine lines 132 formed in the diffraction grating portions 112. In this way, the fine lines 132 are each suppressed from having a continuous length of 70 μm or more, which may significantly bend unless fixed. As a result, even when the diffraction grating portion 112 is large in size, the diffraction grating that is appropriately formed as designed and does not bend can be formed.

Figure 28:
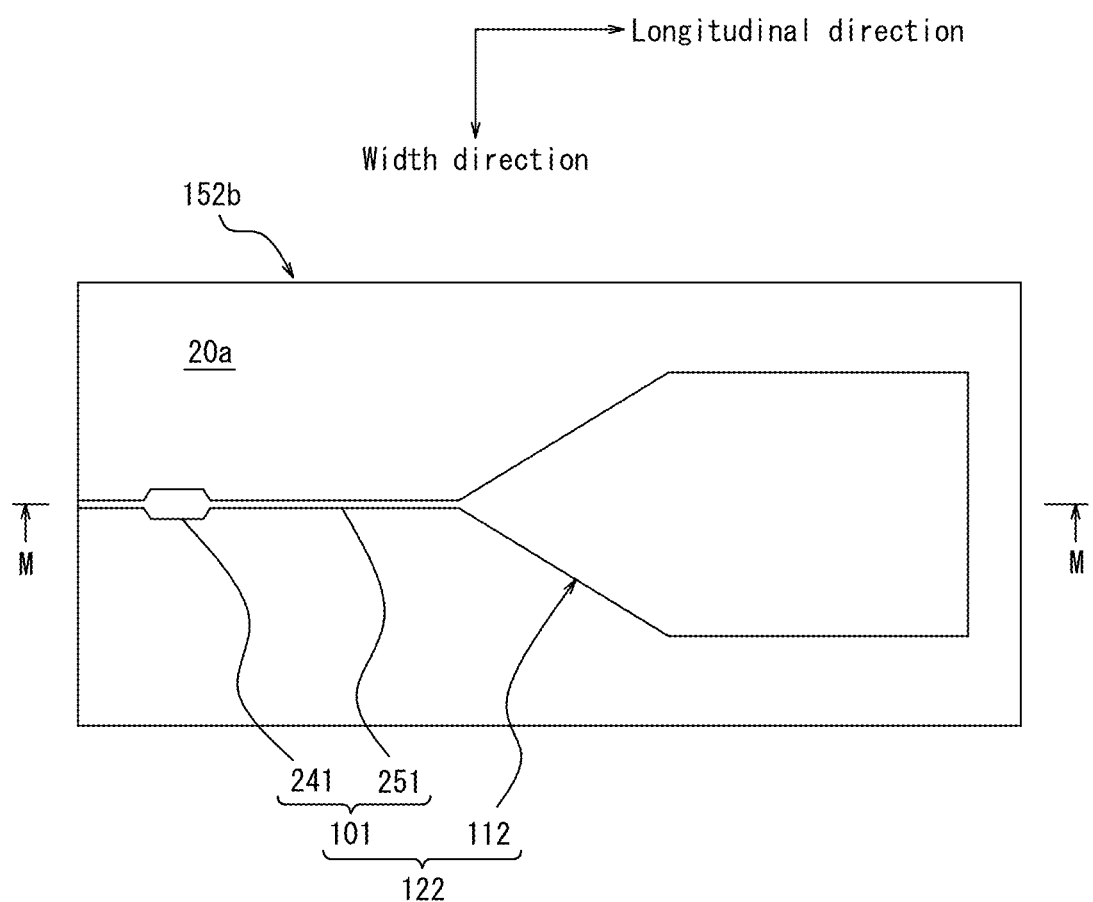
FIG. 28 is a plan view illustrating a portion of an optical waveguide main portion, for explaining a method for manufacturing the optical waveguide according to the fourth embodiment of the present disclosure.
Figure 29:
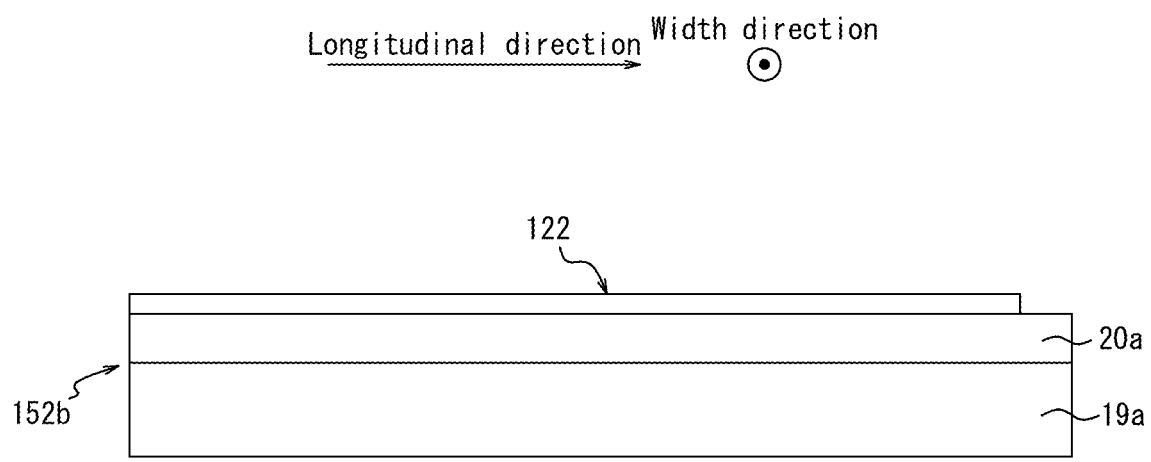
FIG. 29 is a cross-sectional end view of the optical waveguide main portion, taken from line M-M in FIG. 28.
Figure 30:
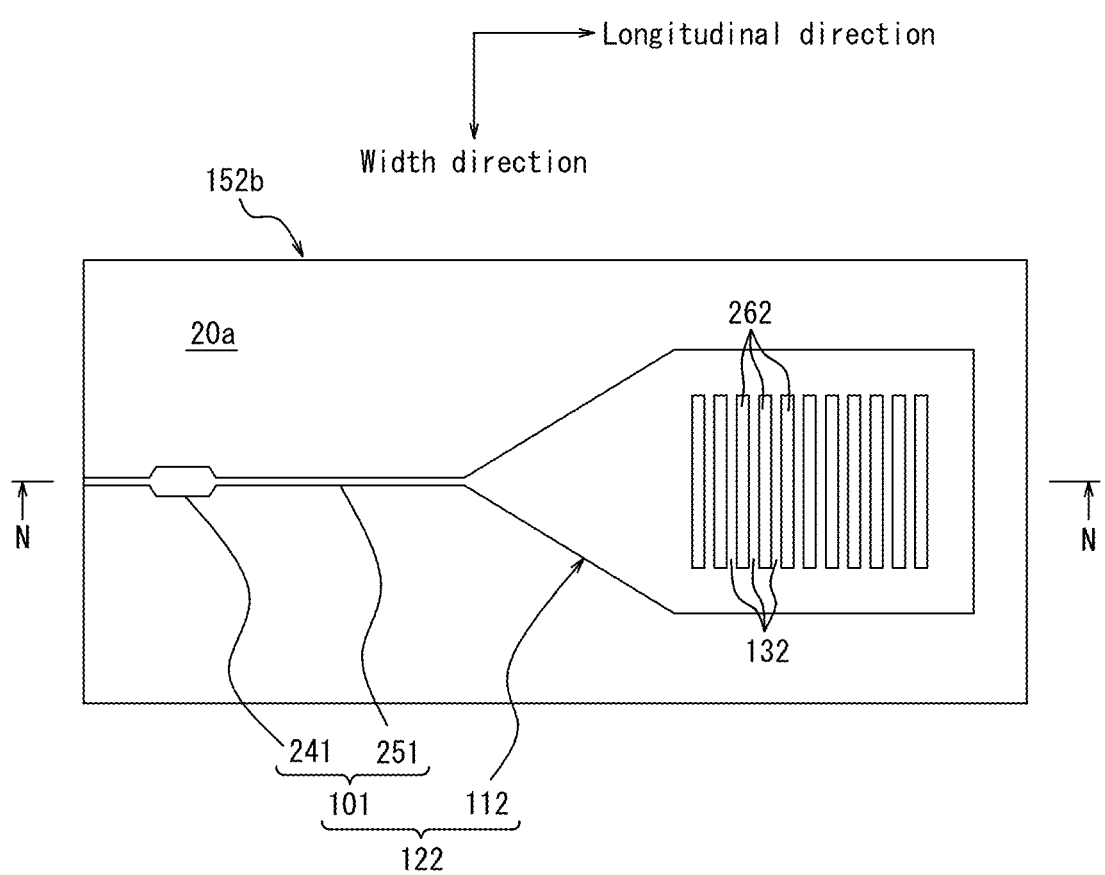
FIG. 30 is a plan view illustrating a portion of the optical waveguide main portion in which a core layer is subjected to half-etching, for explaining the method for manufacturing the optical waveguide according to the fourth embodiment of the present disclosure.
Figure 31:
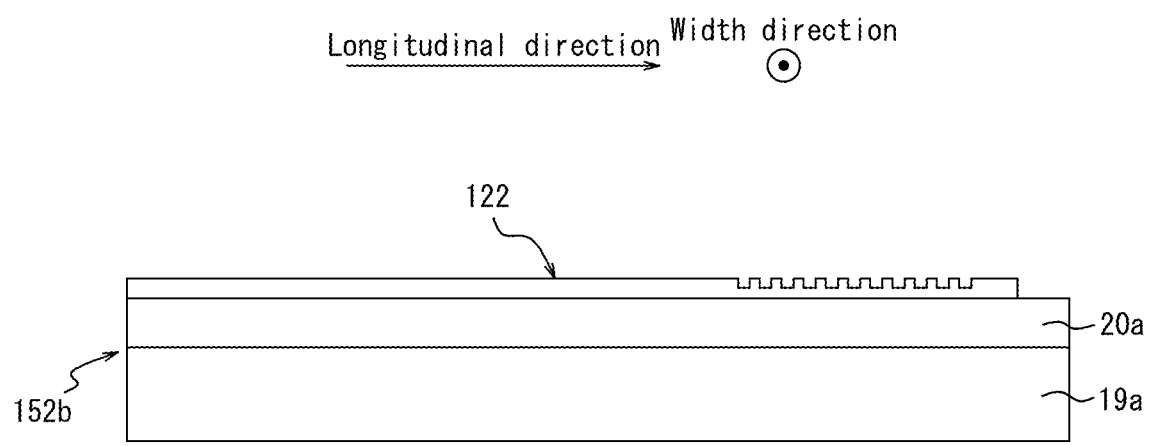
FIG. 31 is a cross-sectional end view of the optical waveguide main portion, taken from line N-N in FIG. 30.
Figure 32:
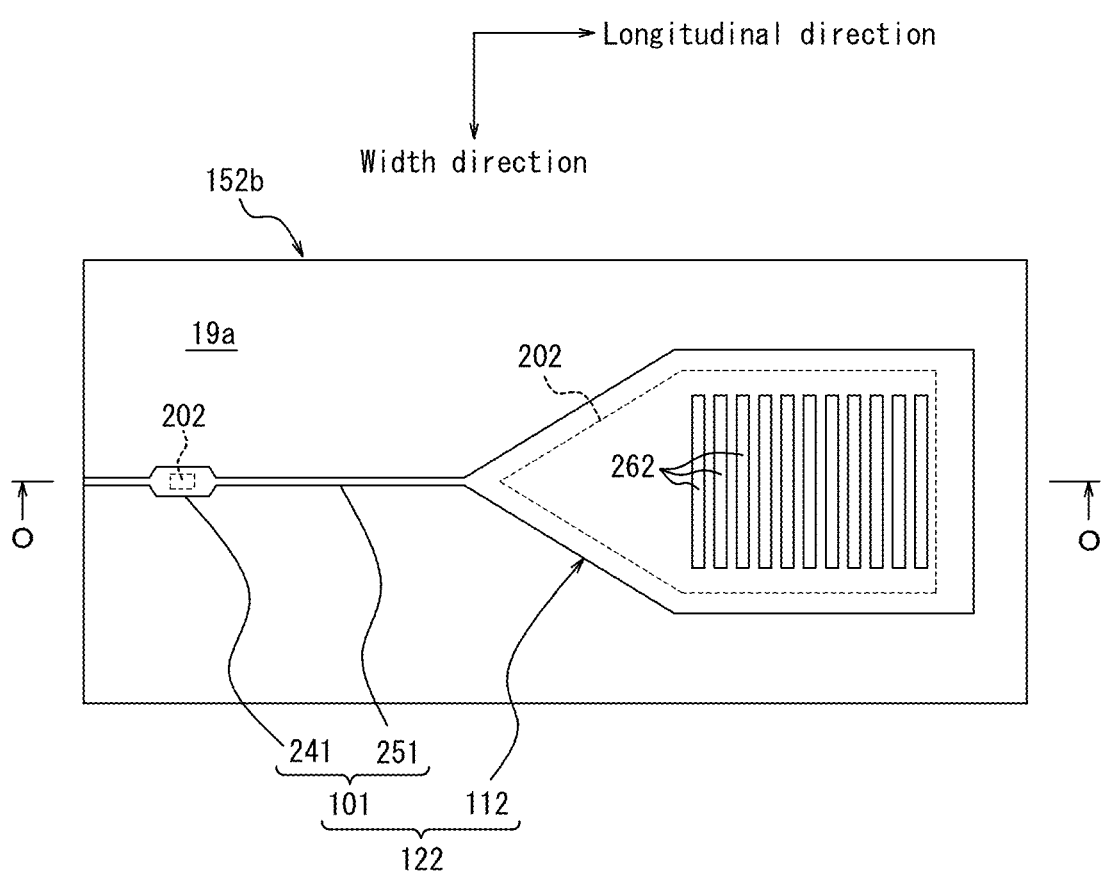
FIG. 32 a plan view illustrating a portion of the optical waveguide main portion from which a BOX layer is partially removed, for explaining the method for manufacturing the optical waveguide according to the fourth embodiment of the present disclosure.
Figure 33:
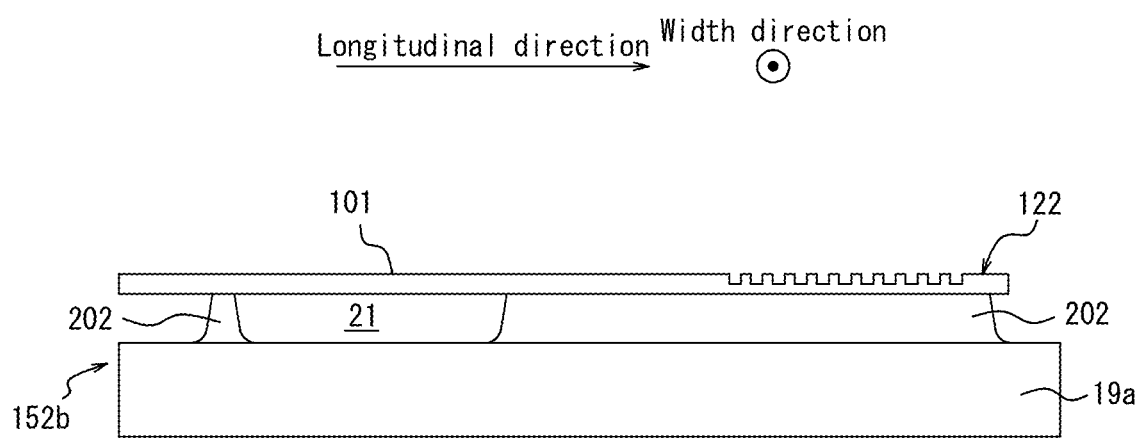
FIG. 33 is a cross-sectional end view of the optical waveguide main portion, taken from line O-O in FIG. 32.
Figure 34:
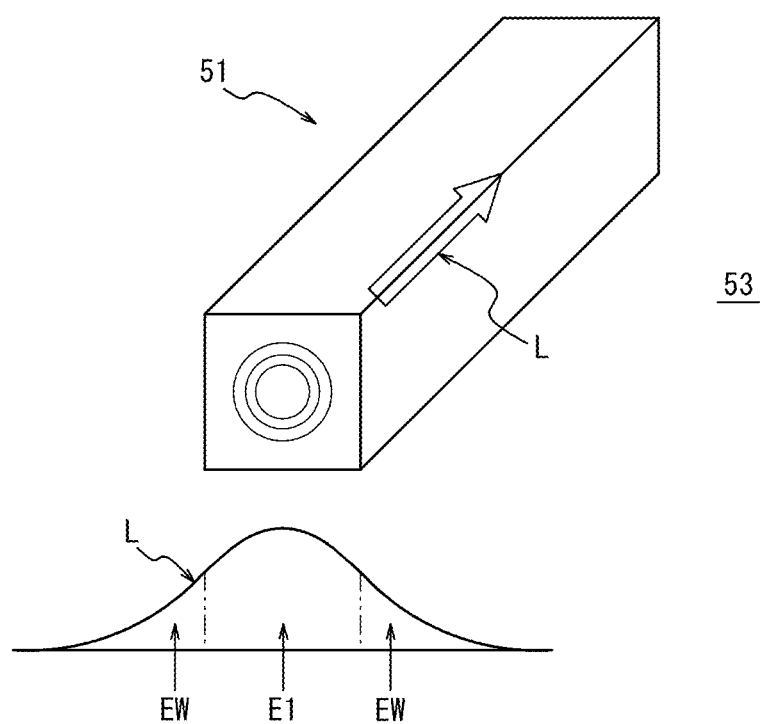
FIG. 34 is a diagram illustrating an evanescent wave of light propagating through an optical waveguide.

Next, a method for manufacturing the optical waveguide 152 according to the fourth embodiment will be described with reference to FIG. 28 to FIG. 33. FIG. 28 is a plan view of a manufacturing process of the optical waveguide 152. FIG. 29 is a cross-sectional end view of the manufacturing process of the optical waveguide 152 taken from line M-M illustrated in FIG. 28. FIG. 30 is a plan view of the manufacturing process of the optical waveguide 152. FIG. 31 is a cross-sectional end view of the manufacturing process of the optical waveguide 152 taken from line N-N illustrated in FIG. 30. FIG. 32 is a plan view of the manufacturing process of the optical waveguide 152. FIG. 33 a cross-sectional end view of the manufacturing process of the optical waveguide 152 taken from line O-O illustrated in FIG. 32.

In the fourth embodiment, after the step of forming the SOI substrate 15a of the first embodiment (see FIG. 4 and FIG. 5), the core layer 122 in which the fine lines 132 are not formed is formed using a pattern mask including the light propagating portion 101 and outlines of the diffraction grating portion 112 alone, as illustrated in FIG. 28 and FIG. 29. By forming the wide portion 241 at the position of the light propagating portion 101 where the support 202 is to be formed in a manner similar to the third embodiment, the support 202 can be formed without using the mask layers (the mask layer M1 used in the first embodiment and the mask layer M2 used in the second embodiment, as illustrated in FIG. 8, FIG. 9, and FIG. 13 to FIG. 15).

Next, the fine lines 132 are formed in the diffraction grating portions 112 by performing lithography and etching, as illustrated in FIG. 30 and FIG. 31. At this time, so-called half etching is performed in the region to be etched, i.e., in the region where the grooves 262 are to be formed, so as to leave the core layer 122 by a predetermined thickness, rather than completely etching throughout the entire thickness of the core layer 122.

Next, a portion of the BOX layer 20a in an optical waveguide main portion 152b is removed by performing wet etching or the like using a portion of the core layer 122 as a mask layer. In this way, the configuration in which the gap 21 is formed between the optical propagating portion 101 and the substrate 19a at a position in the longitudinal direction of the light propagating portion 101, and the entire diffraction grating portion 111 formed of the fine lines 132 having the continuous length of 30 µm or more is fixedly supported by the support 202 can be obtained, as illustrated in FIG. 32 and FIG. 33.

Then, the support substrate 19a is cut in a predetermined region to separate the optical waveguide main portion 152b. Thus, the optical waveguide 152 having the diffraction grating portions 112 in which the fine lines 132 having the respective lengths of 30 µm or more are formed is completed (see FIG. 27).

Further, the light source 17 is arranged in such a manner as to be able to cause infrared radiation IR to enter the corresponding one of the diffraction grating portions 112 (the grating coupler) of the optical waveguide 152, and the photodetector 18 is arranged in such a manner as to be able to receive infrared radiation IR having exited from the corresponding one of the diffraction grating portions 112 (the grating coupler) of the optical waveguide 152, as illustrated in FIG. 27. Thus, the optical concentration measuring apparatus 142 is completed.

According to the optical waveguide 152 of the first to fourth embodiments, as described above includes the light propagating portion 101 that can have an enlarged interaction region of an evanescent wave EW and a substance to be measured, and thus can improve the efficiency in introducing light into the optical waveguide 152 from the light source 17 and the efficiency in extracting light toward the photodetector 18 from the optical waveguide.

REFERENCE SIGNS LIST 10 light propagating portion
11, 111, 112 diffraction grating portion
12, 121, 122 core layer
12a active substrate
13, 131, 132 fine line
14, 142 optical concentration measuring apparatus
15, 150, 151, 152 optical waveguide
15a SOI substrate
15b, 150b, 151b, 152b optical waveguide main portion
16 external space
17 light source
18 photodetector
19 substrate
19a supporting substrate
20, 200, 202 support
20a BOX layer
21 gap
221 fine line subset
231 partition
24 wide portion
25 narrow portion
262 groove
51 structure
53 substance
EW evanescent wave
IR infrared radiation
L light
M1, M2 mask layer

The invention claimed is:

1. An optical waveguide used for an optical concentration measuring apparatus for measuring concentration of a gas to be measured or a liquid to be measured, the optical waveguide comprising:
 a substrate;
 a core layer that extends in a longitudinal direction, is capable of propagating light, and includes a light propagating portion and a diffraction grating portion in which a fine line pattern is formed;
 a support that is formed from a material having a smaller refractive index than a refractive index of the core layer and connects at least a portion of the substrate and at least a portion of the core layer in a manner supporting the core layer with respect to the substrate; and
 a suppressing portion for suppressing deformation of fine lines that form the fine line pattern,
 wherein the support is not provided in an entire region between the light propagating portion and the substrate in a cross-section perpendicular to the longitudinal direction of the core layer at least at a position in the longitudinal direction.

2. The optical waveguide according to claim 1, wherein the suppressing portion includes the support provided between the diffraction grating portion and the substrate.

3. The optical waveguide according to claim 2, wherein the fine lines include a first region in which the support is provided between the fine lines and the substrate, and a second region in which the support is not provided between the fine lines and the substrate.

4. The optical waveguide according to claim 3, wherein the second region of the fine lines have a maximum length of less than 70 µm.

5. The optical waveguide according to claim 3, wherein the second region of the fine lines have a maximum length of less than 50 µm.

6. The optical waveguide according to claim 3, wherein the second region of the fine lines have a maximum length of less than 30 µm.

7. The optical waveguide according to claim 1, wherein the suppressing portion includes a partition provided between fine lines adjacent to each other.

8. The optical waveguide according to claim 7, wherein the partition is integrally formed with a fine line pattern.

9. The optical waveguide according to claim 1, wherein a continuous or intermittent total length of at least one of the fine lines is 30 µm or more.

10. The optical waveguide according to claim 1,
wherein the suppressing portion is provided at least at a position dividing the fine lines into portions having the respective lengths of less than 70 μm.

11. The optical waveguide according to claim 1,
wherein the suppressing portion is provided at least at a position dividing the fine lines into portions having the respective lengths of less than 50 μm.

12. The optical waveguide according to claim 1,
wherein the suppressing portion is provided at least at a position dividing the fine lines into portions having the respective lengths of less than 30 μm.

13. The optical waveguide according to claim 1,
wherein a film formed from a different material from the substrate does not have a thickness of 1 μm or more at least in a portion of a region on the substrate, the region not overlapping with the core layer in a plan view.

14. The optical waveguide according to claim 1,
wherein a film formed from a different material from the substrate does not have a thickness of 0.5 μm or more at least in a portion of a region on the substrate, the region not overlapping with the core layer in a plan view.

15. The optical waveguide according to claim 1,
wherein a film formed from a different material from the substrate is not formed at least in a portion of a region on the substrate, the region not overlapping with the core layer in a plan view.

16. The optical waveguide according to claim 1,
wherein at least a portion of the core layer is exposed or coated with a thin film.

17. An optical concentration measuring apparatus comprising:
the optical waveguide according to claim 1;
a light source capable of introducing light into the core layer; and
a detector capable of receiving light having propagated through the core layer.

18. The optical concentration measuring apparatus according to claim 17,
wherein the light source causes infrared radiation in a wavelength, in vacuum, of 2 μm or more and less than 12 μm to enter the core layer.

* * * * *